US010654161B2

(12) United States Patent
 Aoki

(10) Patent No.: US 10,654,161 B2
(45) Date of Patent: May 19, 2020

(54) WORK TOOL

(71) Applicant: MAKITA CORPORATION, Anjo-shi, Aichi (JP)

(72) Inventor: Yonosuke Aoki, Anjo (JP)

(73) Assignee: MAKITA CORPORATION, Anjo-Shi (JP)

(*) Notice: Subject to any disclaimer, the term of this patent is extended or adjusted under 35 U.S.C. 154(b) by 93 days.

(21) Appl. No.: 15/935,548

(22) Filed: Mar. 26, 2018

(65) Prior Publication Data

US 2018/0283508 A1   Oct. 4, 2018

(30) Foreign Application Priority Data

Mar. 29, 2017 (JP) ................................. 2017-065347
Mar. 29, 2017 (JP) ................................. 2017-065353
(Continued)

(51) Int. Cl.
 *B25F 5/00* (2006.01)
 *F16H 21/40* (2006.01)
(Continued)

(52) U.S. Cl.
 CPC .............. *B25F 5/006* (2013.01); *B25F 5/02* (2013.01); *F16H 21/40* (2013.01); *B23D 51/10* (2013.01); *B23D 51/16* (2013.01)

(58) Field of Classification Search
 CPC .. F16H 21/40; B25F 5/02; B25F 5/006; B25F 3/00; B25F 5/001; B23D 51/10; B23D 51/16
 See application file for complete search history.

(56) References Cited

U.S. PATENT DOCUMENTS 9,505,118 B2 * 11/2016 Furusawa ............ B25D 17/043
9,670,998 B2 *  6/2017 Sumi .................... B27B 19/006
(Continued)

FOREIGN PATENT DOCUMENTS

EP        3208049 A1    8/2017
JP     2009-190131 A    8/2009
WO    2012/045679 A2    4/2012

OTHER PUBLICATIONS

Sep. 7, 2018 Search Report issued in European Patent Application No. 18163400.7.
(Continued)

*Primary Examiner* — Jeremy R Severson
(74) *Attorney, Agent, or Firm* — Oliff PLC

(57) ABSTRACT

A work tool includes an elongate outer housing, an elongate inner housing, a motor, a spindle, and a transmitting mechanism. The inner housing includes a first end part, a second end part, an extending part and an elastic connection part. The motor, the spindle and the transmitting mechanism are disposed in the first end part of the inner housing. The first end part is connected to the outer housing via a first elastic member. The second end part includes a power-source-related device configured to enable power supply from a power source to the motor. The elastic connection part includes second elastic members connecting the extending part and the second end part. The second elastic members are spaced apart from each other in a circumferential direction around the longitudinal direction.

16 Claims, 23 Drawing Sheets

(30) Foreign Application Priority Data

Mar. 29, 2017 (JP) ................................ 2017-065354
Nov. 14, 2017 (JP) ................................ 2017-219124

(51) Int. Cl.
*B25F 5/02* (2006.01)
*B23D 51/10* (2006.01)
*B23D 51/16* (2006.01)

(56) References Cited

U.S. PATENT DOCUMENTS

| | | |
|---|---|---|
| 10,350,721 B2 * | 7/2019 | Aoki ................... B23D 57/00 |
| 2009/0207035 A1 | 8/2009 | Watanabe et al. |
| 2010/0003906 A1 | 1/2010 | Zaiser et al. |
| 2014/0084552 A1 | 3/2014 | Zieger et al. |
| 2016/0221175 A1 * | 8/2016 | Aoki ................... B23D 51/10 |
| 2017/0239803 A1 * | 8/2017 | Aoki ................... B25F 5/006 |

OTHER PUBLICATIONS

Nov. 25, 2019 Office Action issued in European Patent Application No. 19185273.0

* cited by examiner

WORK TOOL

CROSS-REFERENCE TO RELATED APPLICATION

The present application claims priority to Japanese patent application No. 2017-065347 filed on Mar. 29, 2017, Japanese patent application No. 2017-065353 filed on Mar. 29, 2017, Japanese patent application No. 2017-065354 filed on Mar. 29, 2017, and Japanese patent application No. 2017-219124 filed on Nov. 14, 2017. The contents of the foregoing applications are incorporated fully herein by reference.

TECHNICAL FIELD

The present invention relates to a work tool which is configured to perform an operation on a workpiece by driving a tool accessory.

BACKGROUND ART

Work tools are known which perform an operation on a workpiece by transmitting an output of a motor to a spindle and oscillating a tool accessory mounted to a lower end of the spindle. In such work tools, the spindle and the motor are housed in a housing, but the arrangement of the spindle and the motor in the housing varies. For example, in a work tool disclosed in U.S. Patent Application Publication No. 2010/0003906, the spindle is arranged generally in parallel to an output shaft of the motor.

SUMMARY

In the above-described work tool, by arranging the spindle in parallel to the output shaft of the motor, compared with a work tool in which the spindle is arranged orthogonally to the output shaft of the motor, the spindle is arranged closer to the motor, so that the work tool can be reduced in size. In the above-described work tool, however, relatively heavy members such as the motor and a transmitting mechanism for transmitting the output of the motor to the spindle are arranged closer to the spindle, which may lead to a reduction of the moment of inertia of the housing and may cause an increase of vibration during the operation.

Accordingly, it is an object of the present invention to provide a further rational vibration reducing technique for a work tool.

According to one aspect of the present invention, a work tool is provided which is configured to perform an operation on a workpiece by driving a tool accessory. The work tool includes an outer housing, an inner housing, a motor, a spindle and a transmitting mechanism.

The outer housing has an elongate shape. The inner housing has an elongate shape and is housed in the outer housing. The motor has an output shaft. The output shaft is rotatable around a first axis. The first axis extends in a direction crossing a longitudinal direction of the inner housing. The spindle is rotatably supported around a second axis. The second axis extends in parallel to the first axis. The spindle is configured such that the tool accessory is removably mounted thereto. The transmitting mechanism is configured to transmit rotation of the output shaft to the spindle to reciprocally rotate the spindle within a prescribed angle range around the second axis.

The inner housing includes a first end part, a second end part, an extending part and an elastic connection part. The first end part and the second end part are one end part and another other end part of the inner housing in the longitudinal direction of the inner housing, respectively. The extending part is integrally formed with the first end part and extends toward the second end part in the longitudinal direction of the inner housing. The manner that the extending part is "integrally formed with the first end part" here includes not only the manner that the first end part and the extending part are integrally formed as one member, but also the manner that the extending part is formed separately from the first end part and immovably connected to the first end part.

The elastic connection part is configured to elastically connect the extending part and the second end part. The motor, the spindle and the transmitting mechanism are disposed in the first end part of the inner housing. The first end part is connected to the outer housing via a first elastic member. The second end part includes a power-source-related device. The power-source-related device is configured to enable power supply from a power source to the motor. Further, the elastic connection part includes a plurality of second elastic members. The plurality of second elastic members connect the extending part and the second end part, and the second elastic members are spaced apart from each other in a circumferential direction around the longitudinal direction.

The feature "the first end part is connected to the outer housing via a first elastic member" can also be expressed in other words, such as "a first elastic member is interposed between the first end part and the outer housing". For example, the first end part may be connected to the outer housing via only the first elastic member, or via the first elastic member and another member. It may be preferable that a region of the elongate outer housing which is connected to the first end part via the first elastic member is a region in which the first end part is housed. It may also be preferable that the first end part is elastically connected to the outer housing at a plurality of positions so as to be movable in all directions (front-rear, left-right and up-down directions of the work tool) relative to the outer housing. The first elastic member may be formed, for example, of synthetic resin having elasticity, a rubber element, or a spring element.

The number, shape and arrangement positions of the second elastic members in the circumferential direction around the longitudinal direction are not limited, as long as the second elastic members which form the elastic connection part are spaced apart from each other in the circumferential direction Like the first elastic member, the second elastic members may be formed, for example, of synthetic resin having elasticity, a rubber element, or a spring element. The second elastic members and the first elastic member may be formed of the same material or different materials.

According to the present aspect, the motor and the spindle are disposed in the first end part of the elongate outer housing such that the first axis and the second axis are parallel to one another. With such an arrangement, the work tool can be reduced in size. During the operation, relatively large vibration is likely to be caused in the first end part, but the first elastic member can reduce transmission of the vibration from the first end part to the outer housing.

Further, the power-source-related device which enables the power supply from the power source to the motor is disposed in the second end part, while the motor, the spindle and the transmitting mechanism, which are heavy members of the work tool, are all disposed in the first end part. With such an arrangement, the moment of inertia of the inner housing can be increased.

For example, in a case where a battery is employed as the power source, typically, a battery mounting part can be employed as the power-source-related device for enabling the power supply from the battery to the motor. The battery mounting part may be configured such that a battery is removably mounted thereto. In this case, the correspondingly heavy battery may be mounted to the battery mounting part in the second end part. Thus, when the battery is mounted, the moment of inertia of the inner housing can be increased as compared with a structure in which the battery mounting part is formed in the vicinity of the first end part.

In a case where an external alternating-current power source is employed as the power source, typically, a cable and a converter can be employed as the power-source-related device for enabling the power supply from the external alternating-current power source to the motor. The cable may be connectable to the external alternating-current power source. The converter may be connected to the cable and configured to convert alternating current into direct current. In this case, with the correspondingly heavy converter disposed in the second end part, the moment of inertia of the inner housing can be increased as compared with a structure in which the converter is disposed in the vicinity of the first end part. The work tool may further include an inverter and a controller. The inverter may be configured to convert the direct current converted by the converter into alternating current to drive the motor. The controller may be configured to control driving of the motor via the inverter. The inverter and the controller may be disposed in the second end part. In this case, the moment of inertia of the inner housing can be further increased.

In either case, the vibration caused in the inner housing can be reduced by the increase of the moment of inertia of the inner housing. Further, even if a certain degree of load is applied to the accessory tool, the inner housing can be prevented from unnecessarily rotating around the spindle relative to the outer housing.

Further, in the present aspect, the second elastic members that connect the extending part and the second end part can reduce the transmission of the vibration from the first end part to the second end part, thereby contributing to a protection of an electrical component in the second end part, such as the power-source-related device (the battery mounting part and the converter, for example).

According to one aspect of the present invention, the outer housing may include a grip part configured to be held by a user. The extending part may be a portion of the inner housing which corresponds to at least part of the grip part.

According to one aspect of the present invention, the second elastic members may be formed to have a smaller elastic modulus than the extending part and the second end part. In order for the second elastic members to have a smaller elastic modulus, the second elastic members may be at least partially made of a material having a smaller elastic modulus than the extending part and the second end part, or may have a shape that can elastically deform more easily. It may be more preferable that the second elastic members are formed to have a smaller elastic modulus than the first end part, as well as than the extending part and the second end part.

According to one aspect of the present invention, the second end part of the inner housing may be connected to the outer housing via a third elastic member. The feature "the second end part is connected to the outer housing via a third elastic member" can also be expressed in other words, such as "a third elastic member is disposed between the second end part and the outer housing". For example, the second end part may be connected to the outer housing via only the third elastic member, or via the third elastic member and another member. A region of the outer housing which is connected to the second end part via the third elastic member may be a region which houses the second end part, or it may be any other region of the outer housing Like the first elastic member, the third elastic member may be formed, for example, of synthetic resin having elasticity, a rubber element, or a spring element. The third elastic member and the first elastic member may be formed of the same material or different materials.

According to one aspect of the present invention, the outer housing may include a portion disposed within an internal space of the elastic connection part. The internal space may be surrounded by the second elastic members. The second end part of the inner housing may be connected to the portion of the outer housing which is disposed within the internal space via the third elastic member.

According to one aspect of the present invention, the portion of the outer housing which is disposed within the internal space may be formed as a separate member from a cover part of the outer housing and may be fixed to the cover part. The cover part may be another portion of the outer housing which covers the inner housing.

According to one aspect of the present invention, the portion of the outer housing which is disposed within the internal space may be configured as a switch holding member. The switch holding member may be configured to hold a switch for activating the motor.

According to one aspect of the present invention, the first elastic member may comprise a material having a microfoam structure. The microfoam structure may also be referred to as a microcellular structure.

According to one aspect of the present invention, in a case where the longitudinal direction of the inner housing is defined as a front-rear direction, an extending direction of the first axis and the second axis is defined as an up-down direction, and a direction crossing the front-rear direction and the up-down direction is defined as a left-right direction, the extending part may include a left part and a right part which are connected together to form the extending part. The second elastic members may include at least two second elastic members which are connected to the left part and at least two other second elastic members which are connected to the right part.

According to one aspect of the present invention, the work tool may further include a fourth elastic member disposed between the inner housing and the outer housing. The fourth elastic member may be configured to restrict a movement of the inner housing relative to the outer housing in a direction of reciprocating rotation of the spindle.

According to one aspect of the present invention, the second elastic members may be configured as flexible members.

According to one aspect of the present invention, the second elastic members may be symmetrically arranged with respect to a virtual plane including the first axis and the second axis.

According to one aspect of the present invention, in the elastic connection part, the internal space may be communicatively connected with an outside via an opening defined between the second elastic members in the circumferential direction. The opening may provide a connection path when the portion of the outer housing which is disposed within the internal space and the second end part are connected via the third elastic member.

DETAILED DESCRIPTION OF THE EMBODIMENTS

Figure 1:
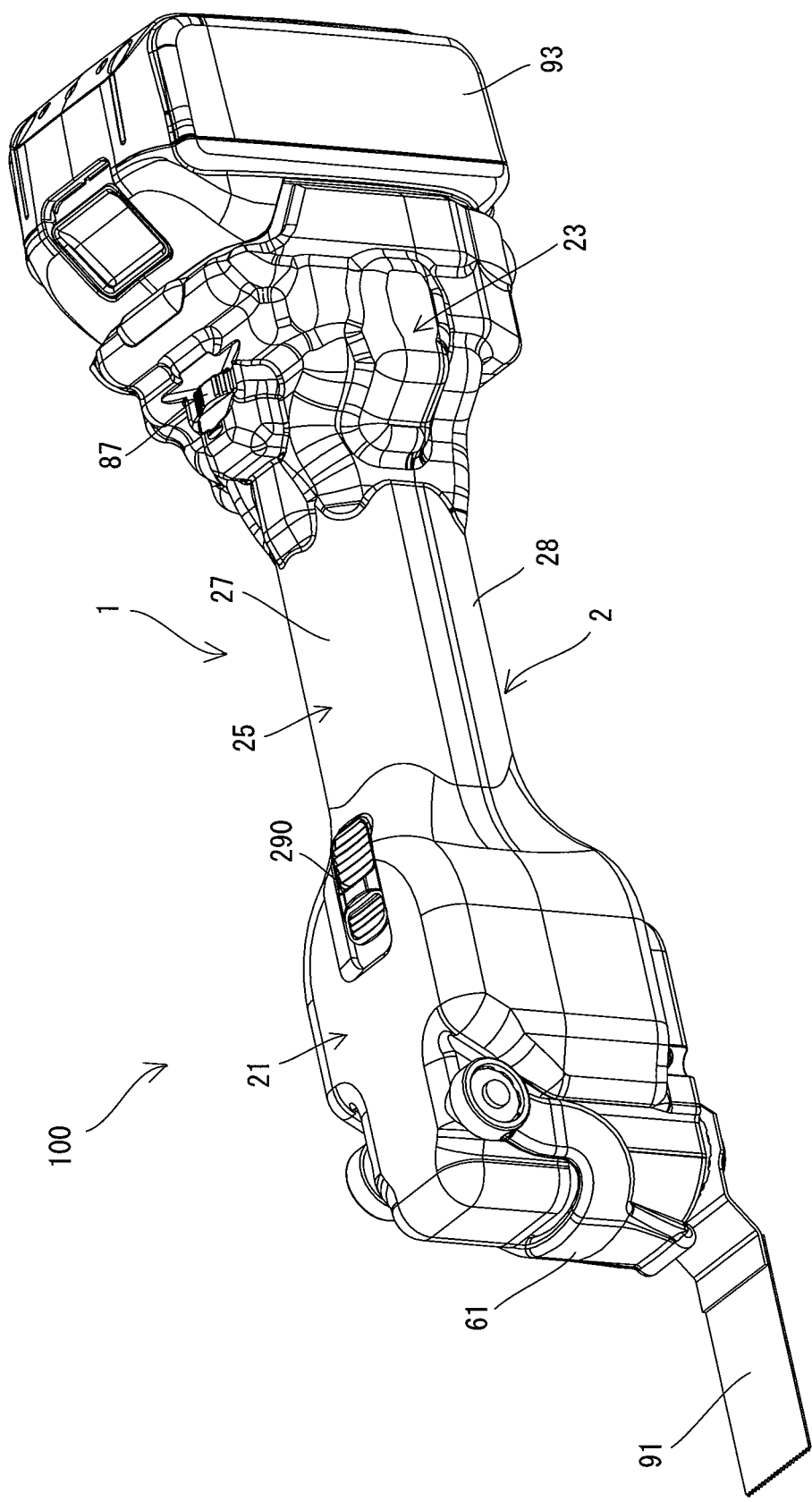
FIG. 1 is a perspective view showing an oscillating tool according to a first embodiment.

Embodiments are described below, with reference to the drawings.

First Embodiment

A first embodiment is now described with reference to FIGS. 1 to 26. In the present embodiment, an electric oscillating tool 100 is described (see FIG. 1) as an example of a work tool which is configured to oscillatorily drive a tool accessory 91 to perform an operation on a workpiece (not shown). Plural kinds of tool accessories 91 such as a blade, a scraper, a grinding pad and a polishing pad which can be mounted to the oscillating tool 100 are available for the oscillating tool 100. In order to perform a desired operation such as cutting, scraping, grinding and polishing, a user may select one of the tool accessories 91 which is suitable for the desired operation and attach the tool accessory 91 to the oscillating tool 100. In the drawings referenced below, a blade attached to the oscillating tool 100 is shown as an example of the tool accessory 91.

Figure 2:
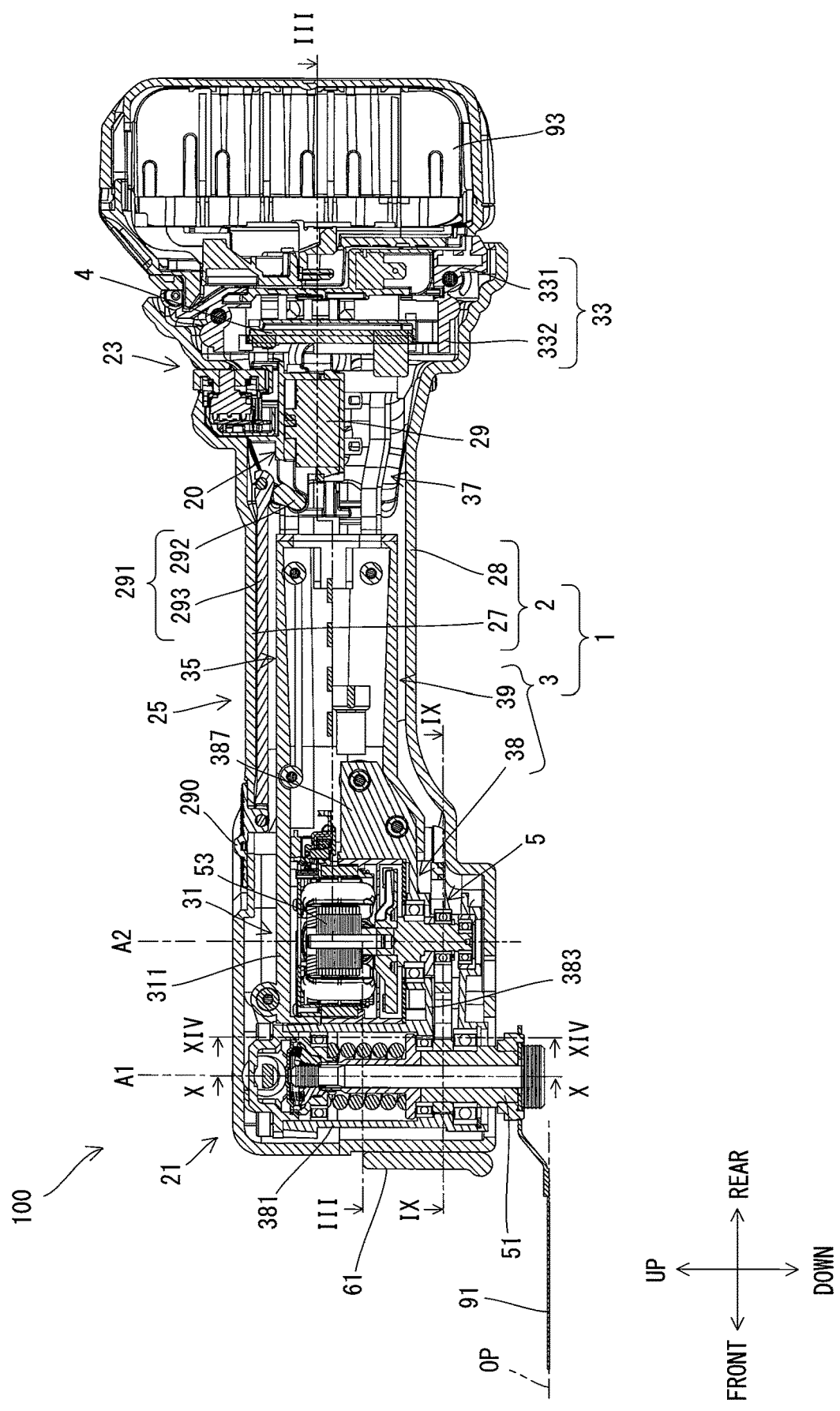
FIG. 2 is a longitudinal section view of the oscillating tool.

First, the general structure of the oscillating tool 100 is described. As shown in FIGS. 1 and 2, the oscillating tool 100 includes an elongate housing 1. In the present embodiment, the housing 1 is configured as a vibration-isolating housing having a two-layered structure. The housing 1 includes an elongate outer housing 2 and an elongate inner housing 3. The outer housing 2 forms an outer shell of the oscillating tool 100. The inner housing 3 is housed in the outer housing 2.

As shown in FIG. 2, a spindle 51 and a motor 53 are housed in one end portion of the housing 1 in an extending direction of the housing 1. The spindle 51 is disposed such that an axis A1 of the spindle 51 extends orthogonally to the extending direction of the housing 1. One end of the spindle 51 in the direction of the axis A1 (the axis A1 direction) protrudes from the housing 1 and is exposed to the outside. The tool accessory 91 can be removably mounted to this exposed part. Further, a battery 93 for supplying power to the motor 53 can be removably mounted to the other end of the housing 1 in the extending direction. The oscillating tool 100 is configured to reciprocally rotate the spindle 51 within a prescribed angle range around the axis A1 and thereby oscillate the tool accessory 91 in an oscillation plane OP. The oscillation plane OP is orthogonal to the axis A1.

In the description below, for the sake of convenience, relating to the directions of the oscillating tool 100, the extending direction of the axis A1 of the spindle 51 is defined as an up-down direction. In the up-down direction, the side of one end part of the spindle 51 to which the tool accessory 91 can be mounted is defined as a lower side, while the opposite side is defined as an upper side. A direction orthogonal to the axis A1 and corresponding to the extending direction of the housing 1 (that is, the direction of the longitudinal axis of the housing 1) is defined as a front-rear direction. In the front-rear direction, the side of one end part of the housing 1 in which the spindle 51 is housed is defined as a front side, while the side of the other end part on which the battery 93 can be mounted is defined as a rear side. Further, a direction orthogonal to both the up-down direction and the front-rear direction is defined as a left-right direction. When the blade shown in the drawings is mounted as the tool accessory 91, the oscillating direction of the tool accessory 91 (blade) substantially corresponds to the left-right direction.

The detailed structure of the oscillating tool 100 is now described. First, the outer housing 2 and the inner housing 3 which form the housing 1 are described.

Figure 3:
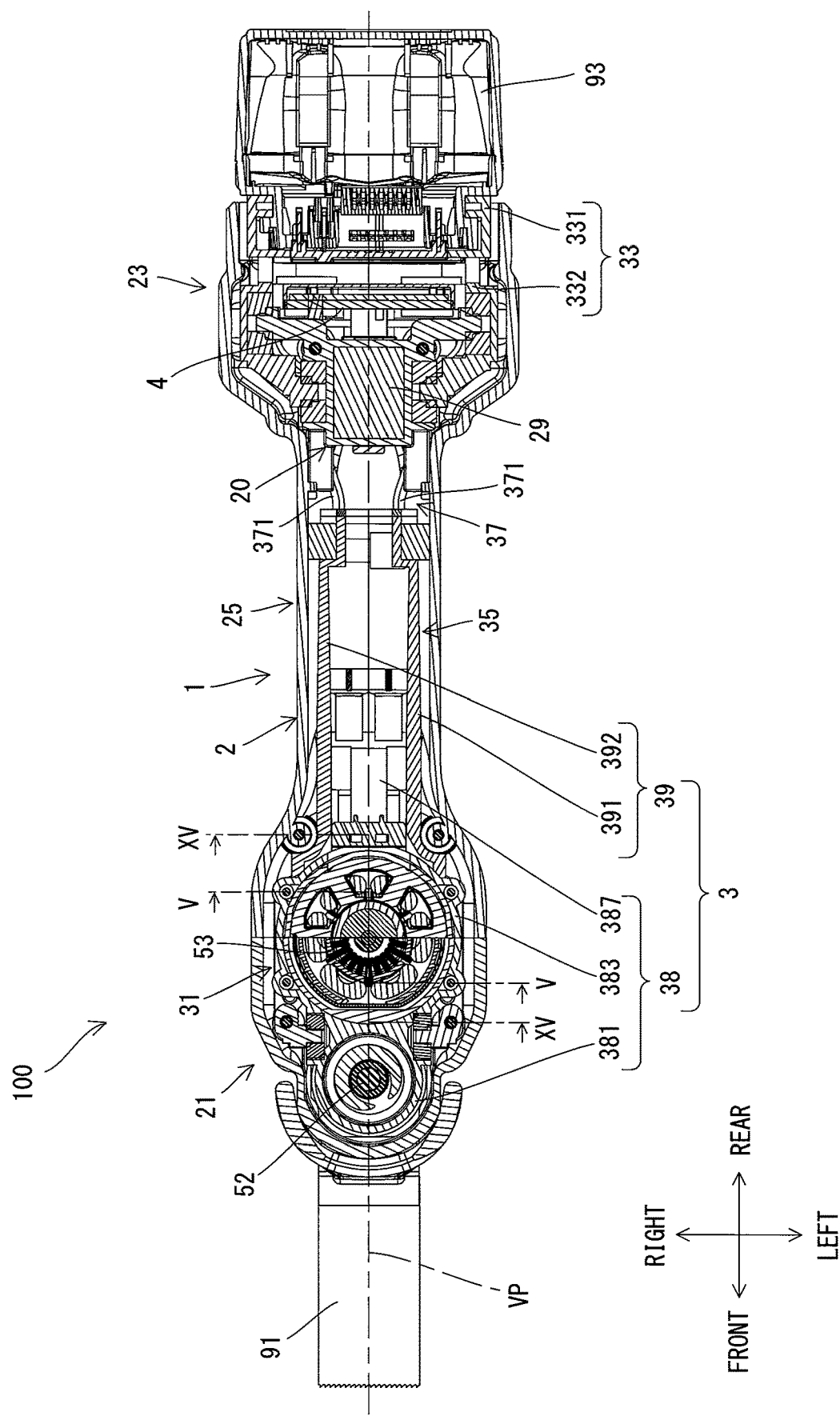
FIG. 3 is a sectional view taken along line III-III in FIG. 2.

As shown in FIGS. 1 to 3, in the present embodiment, the outer housing 2 is formed by connecting an upper shell 27, a lower shell 28 and a switch holder 20, which are formed separately from each other. Each of the upper shell 27, the lower shell 28 and the switch holder 20 is formed from synthetic resin by integral molding. In order to form the outer housing 2, the upper shell 27 and the lower shell 28 are joined together with the switch holder 20 disposed therebetween in the up-down direction, and connected with screws at a plurality of positions. The connecting structure will be described later in further detail.

Further, in the front-rear direction, the outer housing 2 includes a front part 21, a rear part 23, and a central part 25 connecting the front part 21 and the rear part 23.

The front part 21 has a generally rectangular box-like shape. A front part 31 of the inner housing 3, which will be described later, is disposed within the front part 21. A U-shaped operation lever 61 is supported to be rotatable in the up-down direction on an upper front end portion of the front part 21. The operation lever 61 is configured to actuate a lock mechanism 6, which will be described later (see FIG. 7). The rear part 23 has a hollow cylindrical shape that is enlarged (that has a cross section increasing) toward the rear. The rear part 23 includes the switch holder 20 that is fixed in the inside. The structure and arrangement of the switch holder 20 will be described later in detail. Further, an elastic connection part 37 and a rear part 33 of the inner housing 3, which will also be described later, are disposed within the rear part 23.

The central part 25 has a hollow cylindrical shape having a generally constant diameter. The central part 25 linearly extends in the front-rear direction. The central part 25 forms a grip part to be held by a user. Therefore, the central part 25 is formed thinner than the front part 21 and the rear part 23 so as to facilitate the holding. The central part 25 is hereinafter also referred to as a grip part 25. A slider 290 is provided in a boundary region between an upper surface of the central part 25 and an upper surface of the front part 21. The slider 290 is disposed to be slid by the user in the front-rear direction. The slider 290 is configured as an operation member for switching on and off a switch 29.

Figure 4:
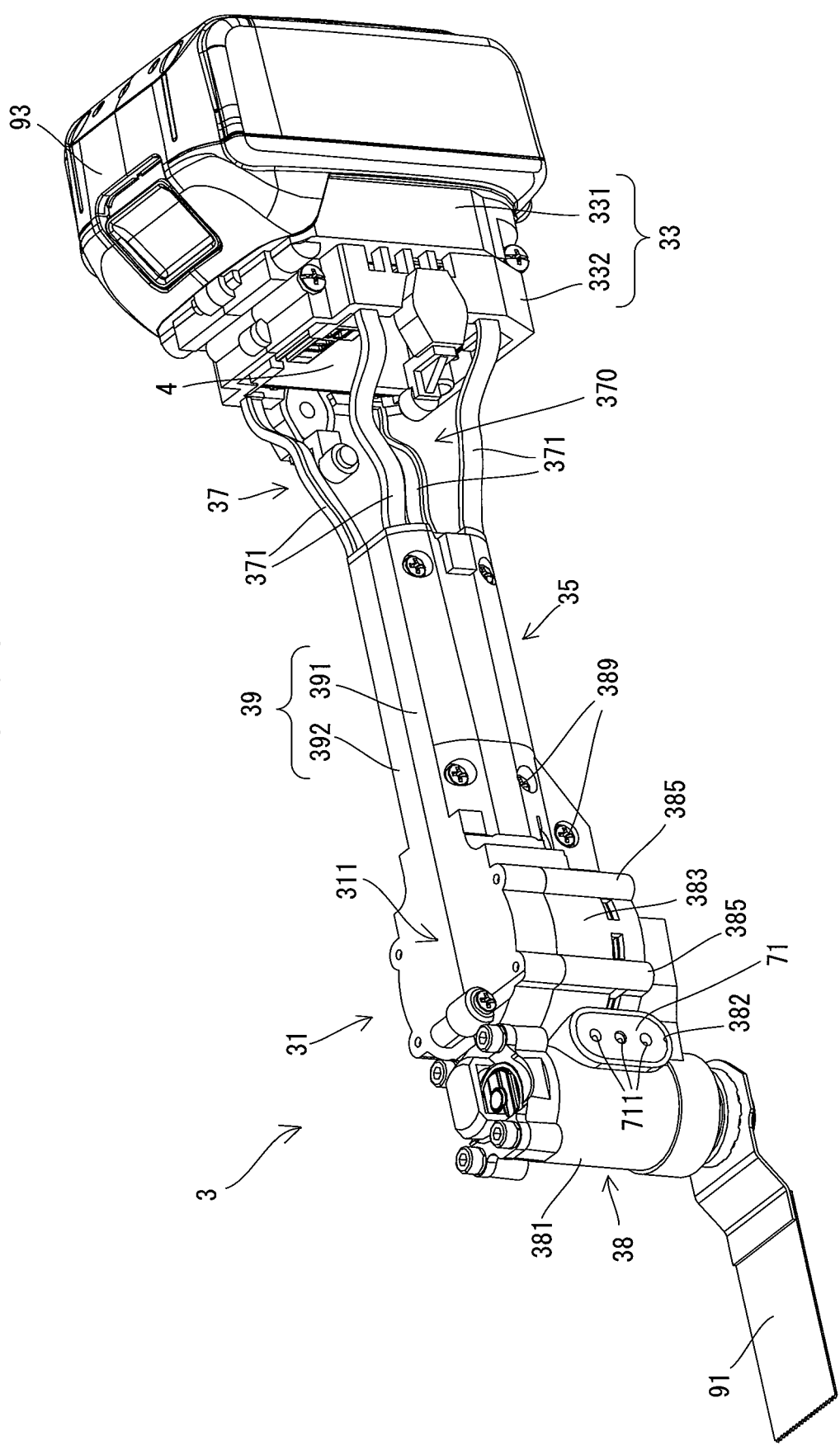
FIG. 4 is a perspective view of an inner housing.

Next, the inner housing 3 is described below. As shown in FIGS. 2 to 4, in the present embodiment, the inner housing 3 is formed by connecting a metal housing 38 and a resin housing 39 which are formed separately from each other.

The metal housing 38 houses a driving mechanism 5 which will be described later. The metal housing 38 includes a spindle housing part 381, a motor housing part 383 and a contact part 387 which are integrally formed. The spindle housing part 381 is shaped like a hollow circular cylinder that extends in the up-down direction. The motor housing part 383 is shaped like a hollow circular cylinder as a whole that has a larger diameter than the spindle housing part 381. The motor housing part 383 is disposed behind the spindle housing part 381. The contact part 387 is a thick plate-like portion extending rearward from a rear end of the motor housing part 383. The contact part 387 is arranged along a virtual vertical plane VP such that the thickness direction of the contact part 387 crosses the vertical plane VP. Here, the vertical plane VP is a virtual plane that includes a center line of the housing 1 in the left-right direction. The vertical plane VP is also a virtual plane including the axes A1 and A2.

The resin housing 39 is made of synthetic resin. The resin housing 39 is formed from a left shell 391 and a right shell 392 which are separate members. In the present embodiment, the left shell 391 and the right shell 392 are formed generally symmetrically in the left-right direction (symmetrical with respect to the vertical plane VP), except for certain portions connected with screws. The inner housing 3 is formed by connecting the left and right shells 391, 392 with screws, in a state in which a rear end portion of the metal housing 38 is held between the left and right shells 391, 392 in the left-right direction. The connecting structure will be described later in detail.

Further, in the front-rear direction, the inner housing 3 includes a front part 31, a rear part 33, an extending part 35 and an elastic connection part 37. The extending part 35 extends rearward from a rear end of the front part 31. The elastic connection part 37 elastically connects the extending part 35 and the rear part 33.

Figure 5:
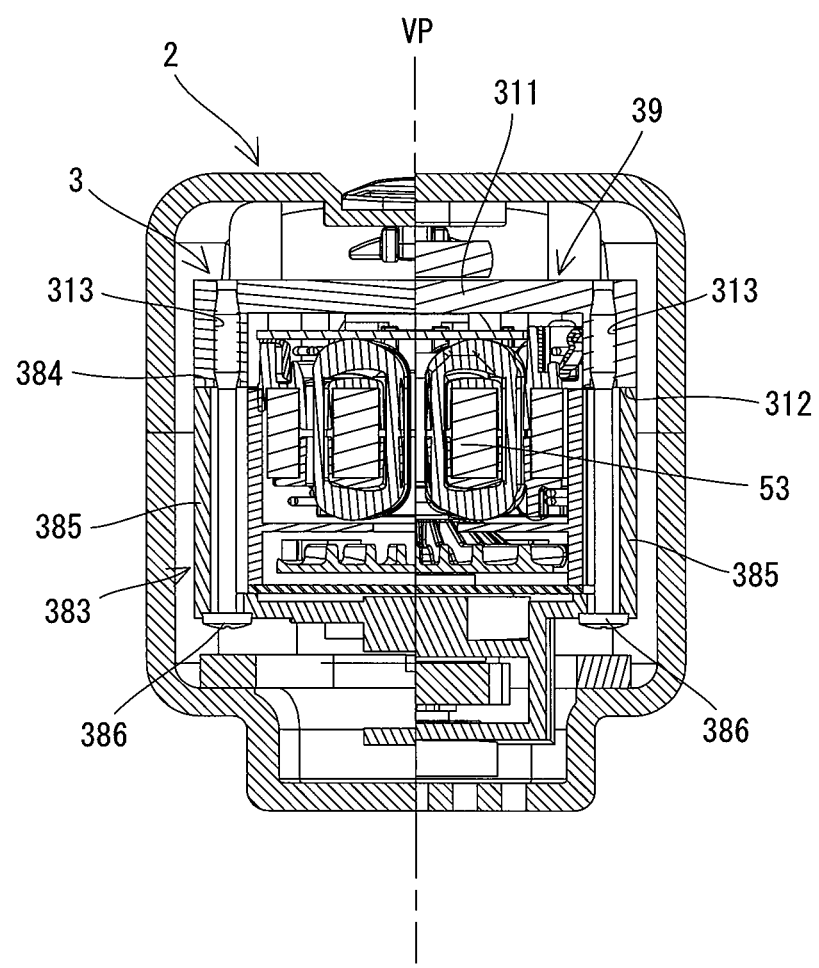
FIG. 5 is a sectional view taken along line V-V in FIG. 3.

The front part 31 is a portion of the inner housing 3 that includes the metal housing 38 and a front end portion of the resin housing 39. The front end portion of the resin housing 39 is shaped to correspond to an upper end portion of the motor housing part 383. The front end portion of the resin housing 39 forms a motor cover part 311 for covering an open upper end of the motor housing part 383. It is noted that, as shown in FIG. 5, an upper end surface 384 of the motor housing part 383 is a mating surface for the motor cover part 311. The upper end surface 384 is formed as a flat surface that is orthogonal to an axis A2. Further, a lower end surface 312 of the motor cover part 311 is a mating surface for the motor housing part 383. The lower end surface 312 is also formed as a flat surface that is orthogonal to the axis A2.

As shown in FIGS. 2 to 4, the rear part 33 is a rear end portion of the resin housing 39 and shaped like a generally rectangular cylinder. In the present embodiment, a rear-side half of the rear part 33 forms a battery mounting part 331. The battery mounting part 331 has an engaging structure that enables the battery 93 to be slidingly engaged therewith. A front-side half of the rear part 33 forms a control unit housing part 332. The control unit housing part 332 houses a control unit 4.

The extending part 35 is a hollow cylindrical portion of the resin housing 39 which extends rearward from a rear end of the motor cover part 311. The extending part 35 is formed to have a larger height in the up-down direction than the motor cover part 311. More specifically, the extending part 35 includes an upper portion extending rearward continuously from the motor cover part 311 and a lower portion protruding downward below the motor cover part 311. A front end of the lower portion of the extending part 35 is arranged to be held in contact with an outer wall surface of the motor housing part 383. Further, the extending part 35 is a portion of the inner housing 3 that corresponds to at least part of the grip part 25 of the outer housing 2. Here, this feature can also be put this way: "the extending part 35 is partially or entirely housed in at least part of the grip part 25". In the present embodiment, the length of the extending part 35 is about the same as the length of the grip part 25 in the front-rear direction, and almost the whole extending part 35 is housed in the grip part 25.

The elastic connection part 37 is a portion of the resin housing 39 which extends rearward from the extending part 35. The elastic connection part 37 includes a plurality of elastic ribs 371. The elastic ribs 371 connect the extending part 35 and the rear part 33 in the front-rear direction. The elastic ribs 371 are spaced apart from each other in a circumferential direction around the longitudinal axis of the inner housing 3 that extends in the front-rear direction. In other words, openings are defined between the adjacent elastic ribs 371. The openings communicatively connect an internal space 370 of the elastic connection part 37 and the outside. In the present embodiment, four such elastic ribs 371 are provided in total. Specifically, the left shell 391 includes two elastic ribs 371 and the right shell 392 also includes two elastic ribs 371. The two elastic ribs 371 on each of the left and right shells 391, 392 are spaced apart from each other in the up-down direction and extend such that the distance therebetween in the up-down direction slightly increases toward the rear. Further, the left and right elastic ribs 371 on the left and right shells 391, 392 extend such that the distance therebetween in the left-right direction increases toward the rear.

Each of the elastic ribs 371 has a curved band-like shape so as to be imparted with flexibility. Thus, the elastic ribs 371 can elastically deform. Further, in the present embodiment, the four elastic ribs 371 are made of a material having a smaller elastic modulus than the other parts (the motor cover part 311, the extending part 35 and the rear part 33) of the resin housing 39. Specifically, the elastic ribs 371 are made of polyacetal containing no reinforced fiber, while the other parts of the resin housing 39 are made of glass fiber-reinforced polyamide. However, the materials of the resin housing 39 are not limited to the present examples. For example, when the other parts are made of glass fiber-reinforced polyamide, the elastic ribs 371 may be made of polycarbonate or ABS (acrylonitrile butadiene styrene) resin (either containing no reinforced fiber). Further, in the present embodiment, although only the elastic ribs 371 are made of a different material from the other parts of the left and right shells 391, 392, each of the left and right shells 391, 392 as a whole is formed by integral molding. As described above, in the present embodiment, the elastic ribs 371 have such shapes that are more easily elastically deformable than the other parts of the resin housing 39. Further, the elastic ribs 371 are made of a material having a smaller elastic modulus. The elastic ribs 371 are thus formed to have a smaller elastic modulus (spring constant) than the other parts.

A structure of connecting the metal housing 38 and the resin housing 39 of the inner housing 3 is now described. In the present embodiment, the metal housing 38 and the resin housing 39 are connected in the front-rear direction by connecting the contact part 387 and a portion of the resin housing 39 which forms a front portion of the extending part 35. Further, the metal housing 38 and the resin housing 39 are connected in the up-down direction via the upper end portion of the motor housing part 383 and the motor cover part 311. This structure is described below in further detail.

Figure 6:
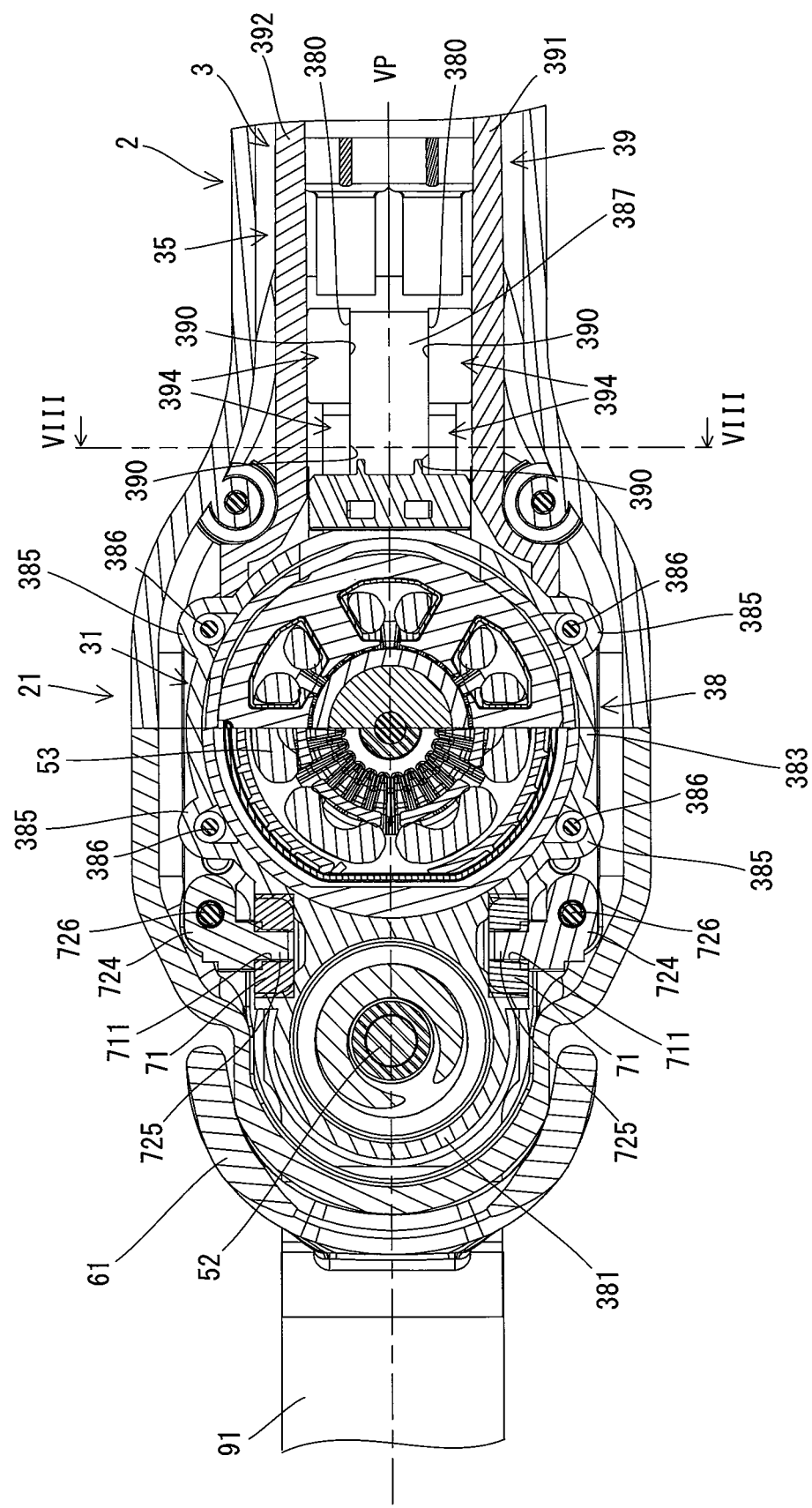
FIG. 6 is an enlarged view of a front part in FIG. 3.
Figure 7:
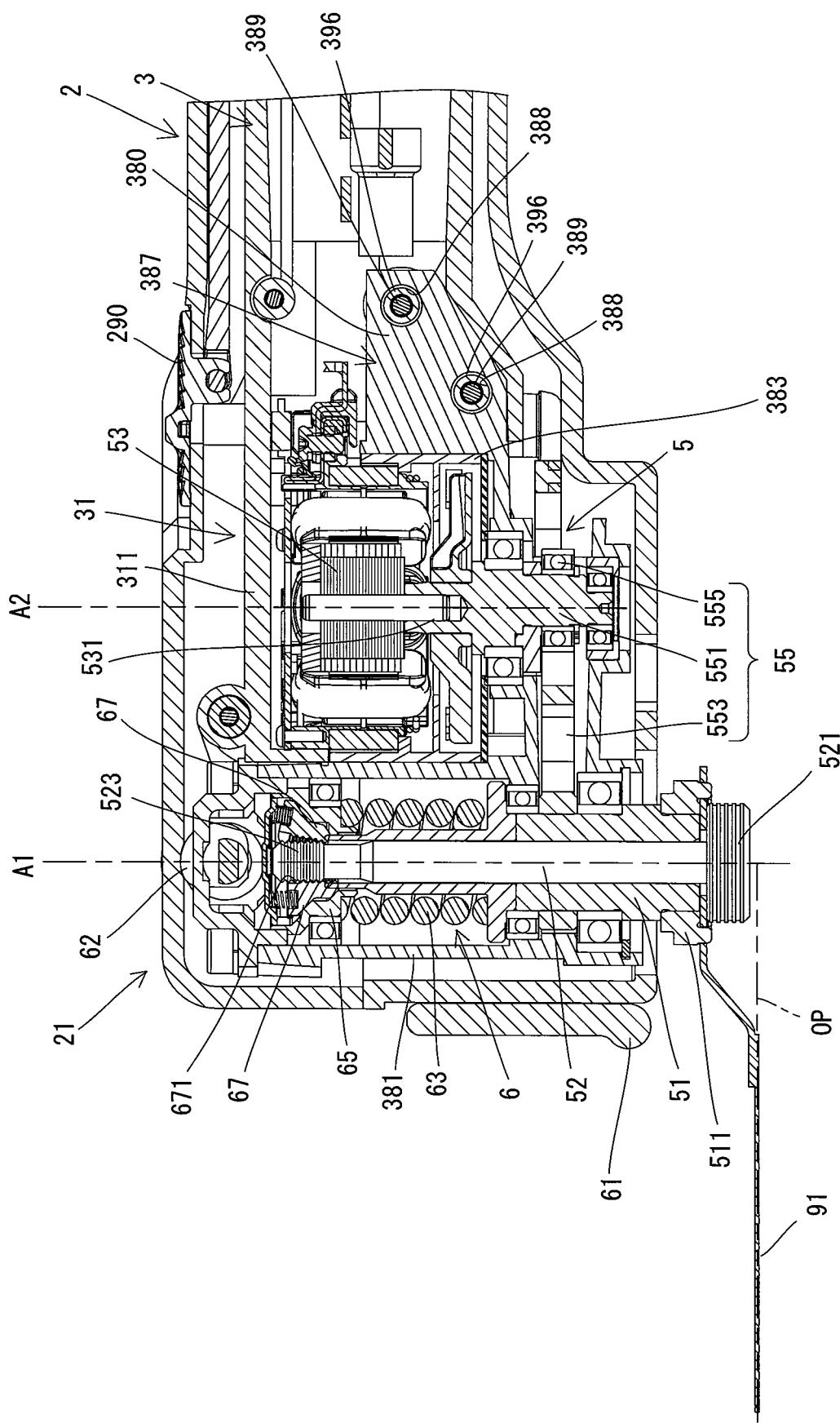
FIG. 7 is an enlarged view of a front part in FIG. 2.

As shown in FIG. 6, each of right and left side surfaces of the contact part 387 is formed as a flat surface that is parallel to the vertical plane VP (in other words, a flat surface whose normal extends in the left-right direction). Each of the right and left side surfaces of the contact part 387 is held in contact with a second contact surface 390 of the resin housing 39 when the metal housing 38 and the resin housing 39 are connected together. Therefore, each of the side surfaces of the contact part 387 are hereinafter also referred to as a first contact surface 380. Further, as shown in FIG. 7, two through holes 388 are formed through the contact part 387 in the left-right direction. The through holes 388 are arranged at positions offset from each other both in the front-rear and in the up-down directions.

Figure 8:
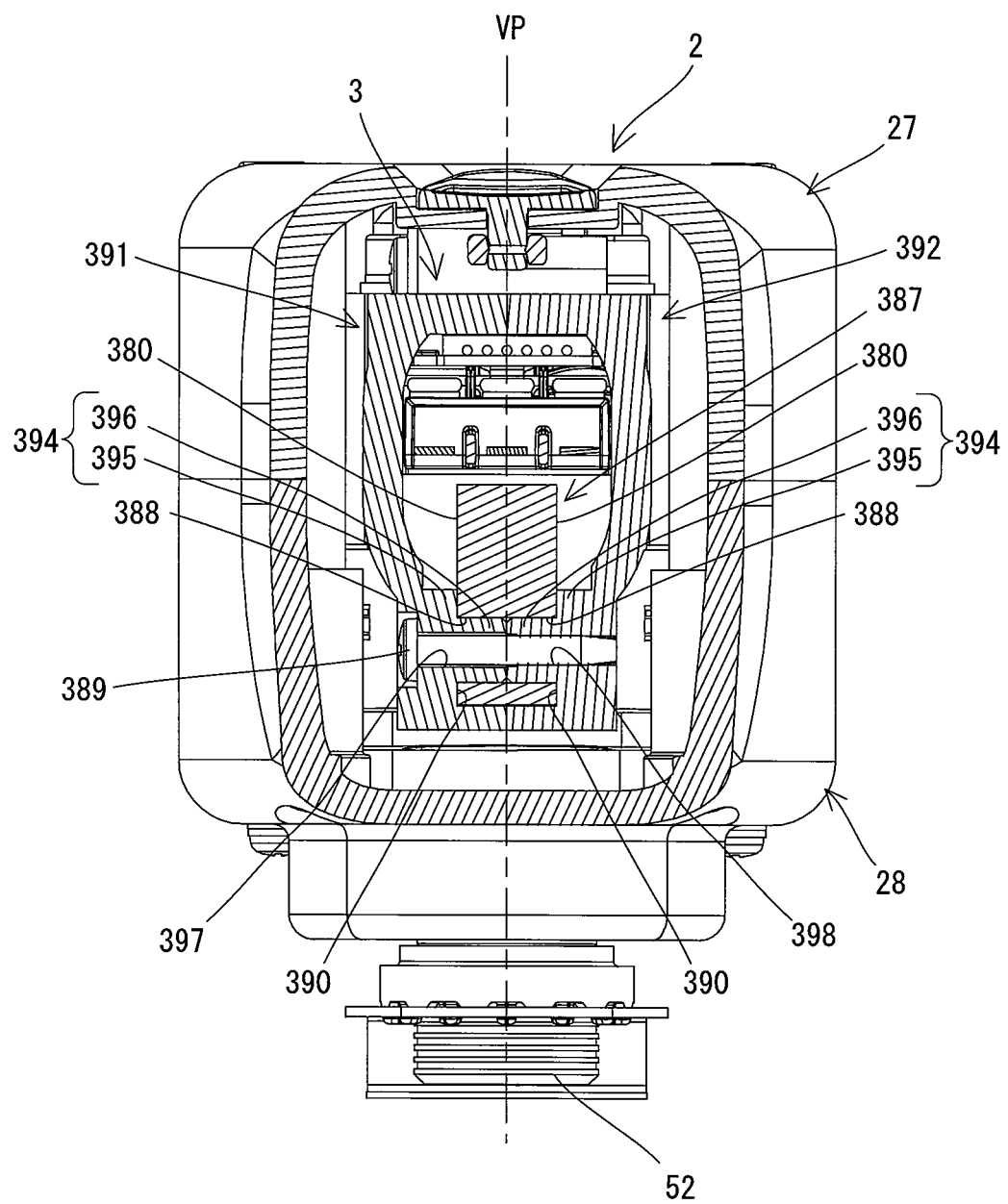
FIG. 8 is a sectional view taken along line VIII-VIII in FIG. 6.

As shown in FIG. 6, two projections 394 are formed on the inner side of each of the left and right shells 391, 392, in the front end portion of the extending part 35. The projections 394 protrude toward the vertical plane VP. As shown in FIG. 8, each of the projections 394 is shaped to have a circular cylindrical portion having a larger diameter than the through hole 388 of the contact part 387 and another circular cylindrical portion having substantially the same diameter as the through hole 388. The cylindrical portions are coaxially and contiguously formed with each other. The cylindrical portion having the larger diameter is hereinafter referred to as a large-diameter part 395. The cylindrical portion having the smaller diameter is hereinafter referred to as a small-diameter part 396. An annular protruding end surface of the large-diameter part 395 is formed as a flat surface that is parallel to the vertical plane VP (in other words, a flat surface whose normal extends in the left-right direction). The protruding end surface of the large-diameter part 395 is held in contact with the first contact surface 380 when the metal housing 38 and the resin housing 39 are connected together. Therefore, the protruding end surface of the large-diameter part 395 is hereinafter also referred to as a second contact surface 390. The small-diameter part 396 is inserted into the through hole 388 when the metal housing 38 and the resin housing 39 are connected together. Therefore, on each of the left and right shells 391, 392, the two projections 394 are provided at positions corresponding to the through holes 388. Further, each of the projections 394 of the left shell 391 has a stepped through hole 397 extending therethrough in the left-right direction along an axis of the projection 394. Each of the projections 394 of the right shell 392 has a threaded hole 398 extending therethrough in the left-right direction along an axis of the projection 394.

When connecting the metal housing 38 and the resin housing 39, an assembler of the oscillating tool 100 holds the rear portion of the metal housing 38 from both sides in the left-right direction with the left and right shells 391, 392. At this time, as shown in FIG. 8, the second contact surface 390 of the large-diameter part 395 comes into contact with the first contact surface 380 of the contact part 387. Further, the small-diameter parts 396 of the left and right shells 391, 392 are inserted into the through hole 388 of the contact part 387 from the both sides in the left-right direction. The protruding length of the small-diameter part 396 protruding from the large-diameter part 395 is about a half of the thickness (the width in the left-right direction) of the contact part 387. In this state, the assembler inserts a fastening screw 389 through the through hole 397 of the left shell 391 from the left side and tightens the screw 389 into the threaded hole 398 of the right shell 391. In this manner, the left shell 391, the contact part 387 and the right shell 392 are firmly connected together without any gap in the left-right direction by an axial force of the screw 389.

Further, as shown in FIG. 6, the motor housing part 383 has four screw inserting parts 385 that are formed at four places in the circumferential direction. Each of the screw inserting parts 385 protrudes outward in a radial direction of the motor housing part 383 to have a semi-circular cross section, and extends in the up-down direction. As shown in FIG. 5, the motor cover part 311 has four threaded holes 313 that are formed at positions corresponding to the screw inserting parts 385 and that extend in the up-down direction. The assembler inserts a screw 386 from below the motor housing part 383 through each of through holes defined between the screw inserting parts 385 and the motor 53, and tightens the screw 386 into the threaded hole 313. The motor housing part 383 and the motor cover part 311 are thus connected together. The screws 386 are loosely disposed between the screw inserting parts 385 and the motor 53.

In addition to the above-described connecting positions, as shown in FIGS. 2 and 4, additional bosses formed on the left and right shells 391, 392 are fitted together and connected with screws by the assembler. In this manner, the inner housing 3 of the present embodiment can be very easily assembled.

The internal configuration of the inner housing 3 is now described.

First, the internal configuration of the front part 31 is described. As shown in FIG. 7, the front part 31 of the inner housing 3 houses the driving mechanism 5 and the lock mechanism 6.

The driving mechanism 5 is described below. As shown in FIG. 7, the driving mechanism 5 is a mechanism that is configured to oscillatorily drive the tool accessory 91. The driving mechanism 5 includes the spindle 51, the motor 53 and a transmitting mechanism 55.

The spindle 51 is a generally cylindrical elongate member. In the present embodiment, the spindle 51 is housed in a lower portion of the spindle housing part 381. The spindle 51 is supported by two bearings so as to be rotatable around the axis A1. The spindle 51 has a lower end portion which is exposed from the housing 1 to the outside. The lower end portion includes a flange-like tool mounting part 511 which protrudes radially outward. The tool mounting part 511 is configured such that the tool accessory 91 is removably mounted thereto. In the present embodiment, the tool accessory 91 may be clamped between the tool mounting part 511 and a clamp head 521 of a clamp shaft 52 which is held at a clamping position by the lock mechanism 6, which will be described later.

The motor 53 serving as a driving source is housed in the motor housing part 383 such that an axis A2 of the output shaft 531, which rotates together with a rotor, extends in parallel to the axis A1 of the spindle 51 (that is, in the up-down direction). The output shaft 531 protrudes downward from the rotor. In the present embodiment, a small-sized high-output brushless motor is employed as the motor 53.

Figure 9:
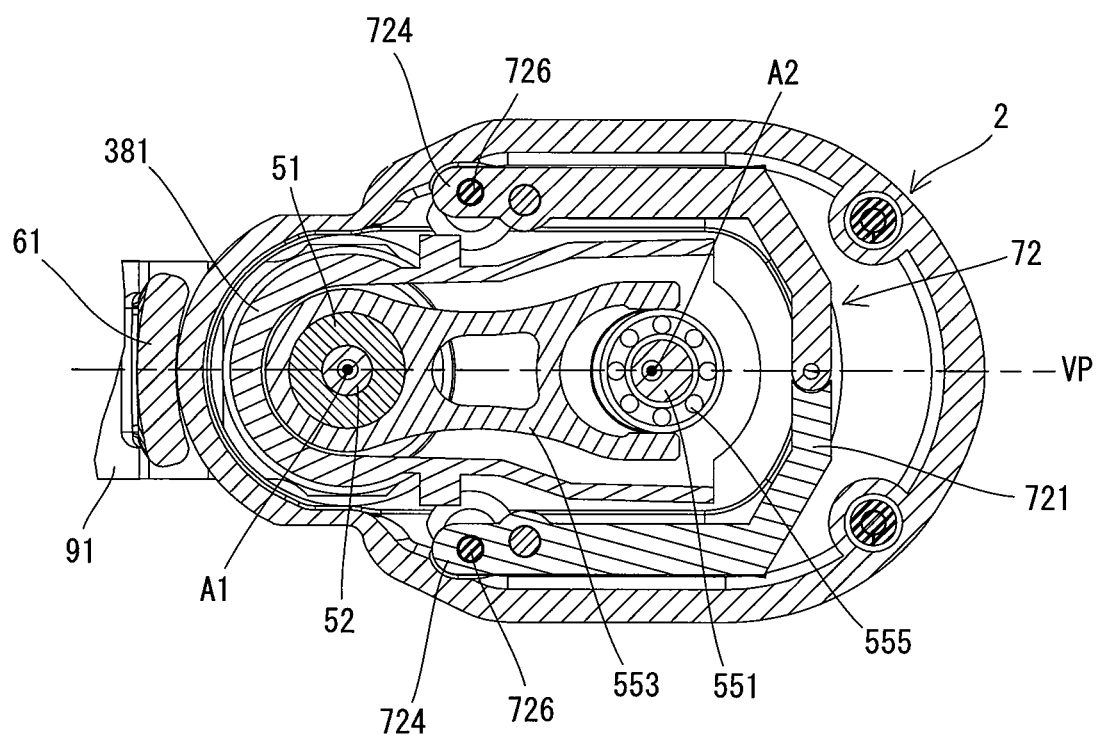
FIG. 9 is a sectional view taken along line IX-IX in FIG. 2.

The transmitting mechanism 55 is configured to transmit rotation of the motor 53 to the spindle 51 and reciprocally rotate the spindle 51 around the axis A1 within the prescribed angle range. The transmitting mechanism 55 is arranged within the metal housing 38 and extend over a lower region of the spindle housing part 381 and a lower region of the motor housing part 383. The transmitting mechanism 55 of the present embodiment includes an eccentric shaft 551, an oscillating arm 553 and a drive bearing 555. The structure of the transmitting mechanism 55 is well known and therefore only briefly described here. The eccentric shaft 551 is coaxially connected to the output shaft 531 of the motor 53 and includes an eccentric part that is offset from the axis A2. The drive bearing 555 is mounted onto an outer periphery of the eccentric part. The oscillating arm 553 connects the drive bearing 555 and the spindle 51. As shown in FIG. 9, one end portion of the oscillating arm 553 is annularly formed and fixed to an outer periphery of the spindle 51. The other end portion of the oscillating arm 553 is bifurcated and disposed to be in contact with an outer periphery of the drive bearing 555 from the right and left.

When the motor 53 is driven, the eccentric shaft 551 rotates together with the output shaft 531. When the eccentric shaft 551 rotates, a center of the eccentric part moves around the axis A2 and thus the drive bearing 555 also moves around the axis A2. This movement causes the oscillating arm 553 to oscillate around the axis A1 within a prescribed angle range. When the oscillating arm 553 oscillates, the spindle 51 reciprocally rotates around the axis A1 within the prescribed angle range since one end portion of the oscillating arm 553 is fixed to the spindle 51. As a result, the tool accessory 91 fixed to the spindle 51 (more specifically, the tool mounting part 511) is oscillatorily driven within the oscillation plane OP, so that an operation can be performed.

Figure 10:
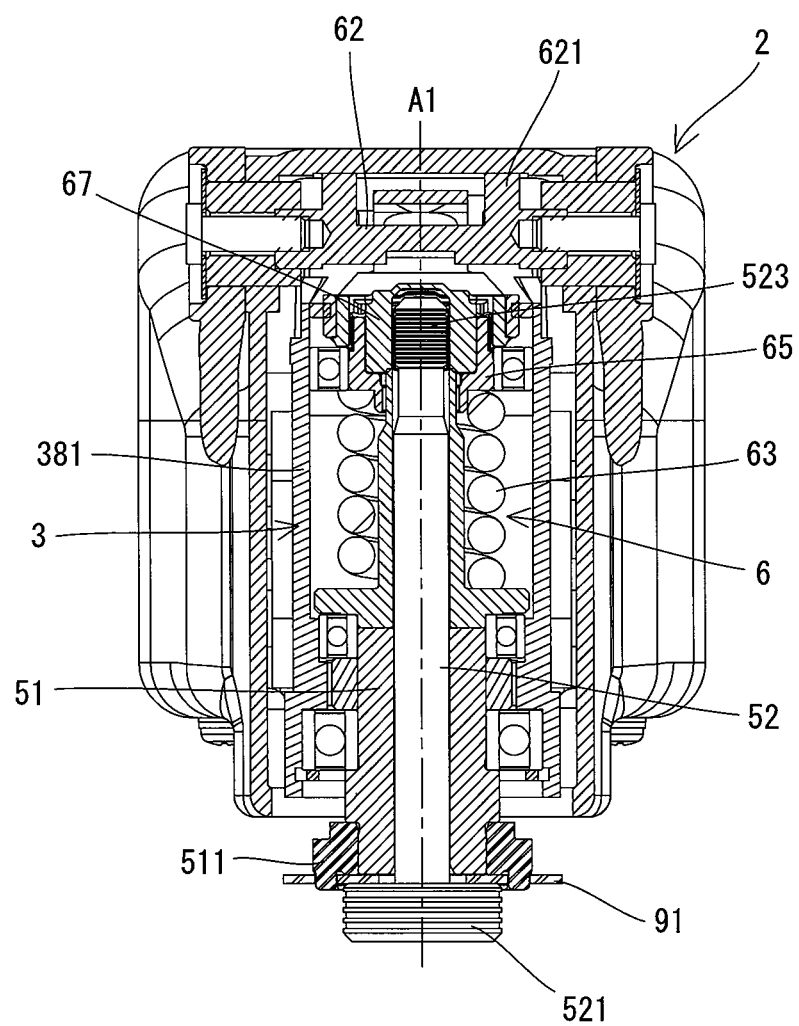
FIG. 10 is a sectional view taken along line X-X in FIG. 2.

The lock mechanism 6 is now described. The lock mechanism 6 is configured to lock the clamp shaft 52 at the clamping position (as shown in FIGS. 7 and 10). The clamping position refers to a position of the clamp shaft 52 in which the clamp shaft 52 and the spindle 51 can clamp the tool accessory 91 therebetween. As shown in FIGS. 7 and 10, the clamp shaft 52 is a generally cylindrical elongate member. The clamp shaft 52 is configured to be coaxially inserted through the spindle 51 along the axis A1. The clamp shaft 52 has a flange-like clamp head 521 on its lower end portion. Further, a groove part 523 is formed in an upper end portion of the clamp shaft 52. The groove part 523 has grooves formed around the entire circumference of the clamp shaft 52. The grooves are arranged in the up-down direction.

The lock mechanism 6 of the present embodiment is disposed above the spindle 51 within the spindle housing part 381. The lock mechanism 6 includes a compression coil spring 63, a collar 65 and a pair of clamp members 67. The structure of the lock mechanism 6 is well known and therefore only briefly described here. The collar 65 is annularly formed and rotatably supported by a bearing held within an upper region of the spindle housing part 381. The collar 65 is always biased upward by the compression coil spring 63 disposed between the spindle 51 and the collar 65. The clamp members 67 are always biased downward and arranged to face with each other in the front-rear direction within an inner space of the collar 65. A ridge part 671 is formed on each of opposed surfaces of the clamp members 67. The ridge part 671 has horizontally extending ridges arranged in the up-down direction.

The lock mechanism 6 is configured to operate in interlock with a turning operation of the operation lever 61 by the user. The operation lever 61 is connected to a rotary shaft 62. The rotary shaft 62 is supported above the lock mechanism 6 by the outer housing 2 so as to be rotatable around a rotation axis that extends in the left-right direction. The rotary shaft 62 rotates in interlock with the turning operation of the operation lever 61.

As shown in FIG. 10, the rotary shaft 62 has an eccentric part 621 that is offset from the rotation axis. When the operation lever 61 is placed at a lock position as shown in FIG. 1, a smaller-diameter part of the eccentric part 621 is located above and away from the collar 65. Therefore, the collar 65 is biased upward by the compression coil spring 63 and located at an uppermost position. On the other hand, the clamp member 67 is biased downward. Therefore, the clamp member 67 is moved inward in the radial direction of the collar 65 by interaction between inclined surfaces that are respectively formed in part of an inner circumferential surface of the collar 65 and in part of an outer circumferential surface of the clamp member 67. As a result, the ridge part 671 is engaged with the groove part 523, and the clamp shaft 52 is clamped between the clamp members 67. In this state, the clamp shaft 52 is biased upward by the compression coil spring 63 and locked at the clamping position. In this manner, the tool accessory 91 can be clamped between the tool mounting part 511 and the clamp head 521 and thus fixed to the spindle 51.

When the operation lever 61 is turned upward from the lock position shown in FIG. 1 to an unlock position, a larger-diameter part of the eccentric part 621 comes into contact with an upper end of the collar 65 from above and pushes down the collar 65 against the biasing force of the compression coil spring 63. The clamp member 67 is also pushed downward together with the collar 65 to a prescribed position, and prohibited from further moving downward. In this state, when only the collar 65 is further moved to a lowermost position, the inclined surfaces of the collar 65 and the clamp member 67 comes out of contact with each other, so that the clamp members 67 are allowed to move radially outward. In other words, the clamp shaft 52 is unlocked, so that the user can pull the clamp shaft 52 out of the spindle 51.

Figure 11:
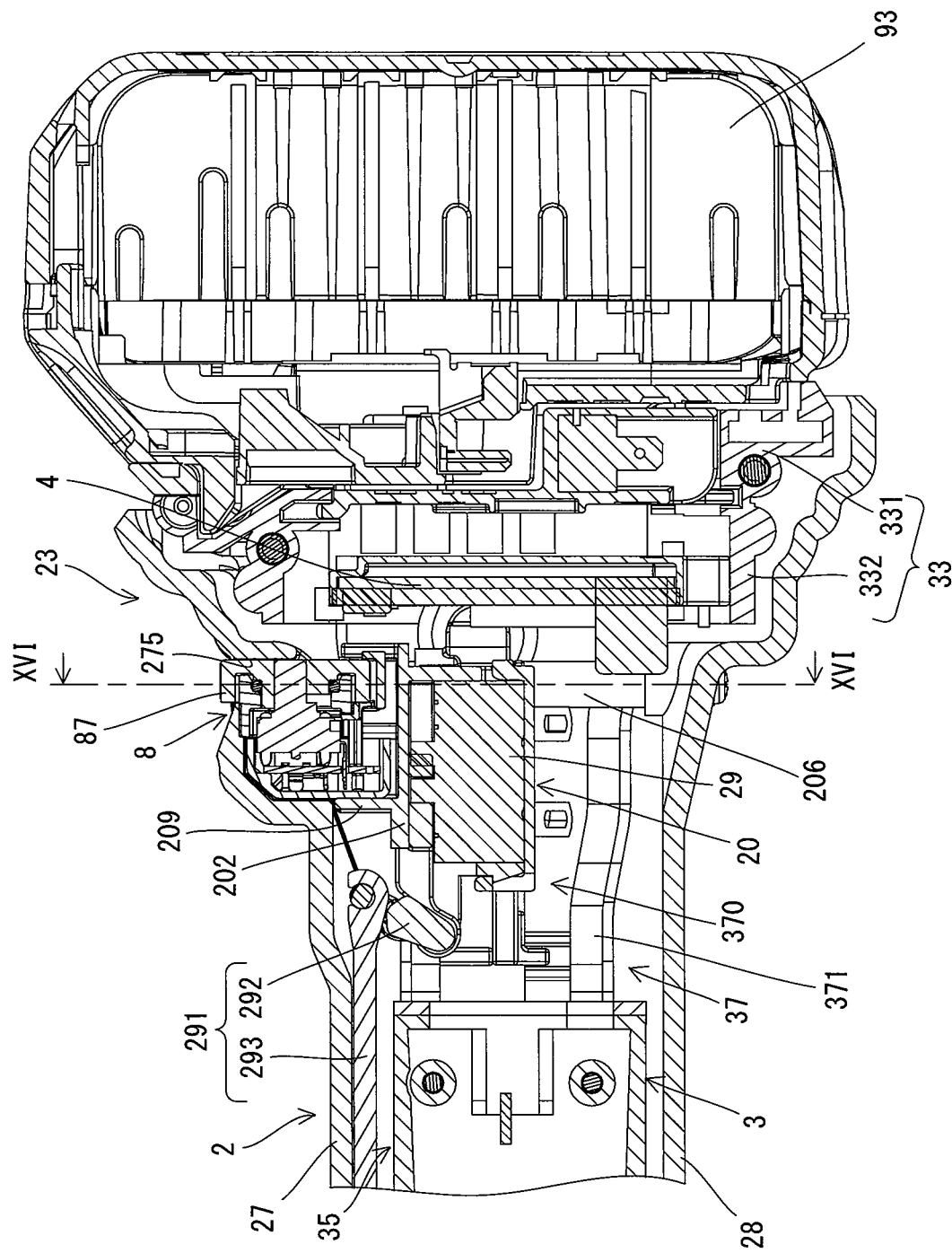
FIG. 11 is an enlarged view of a rear part in FIG. 2.
Figure 12:
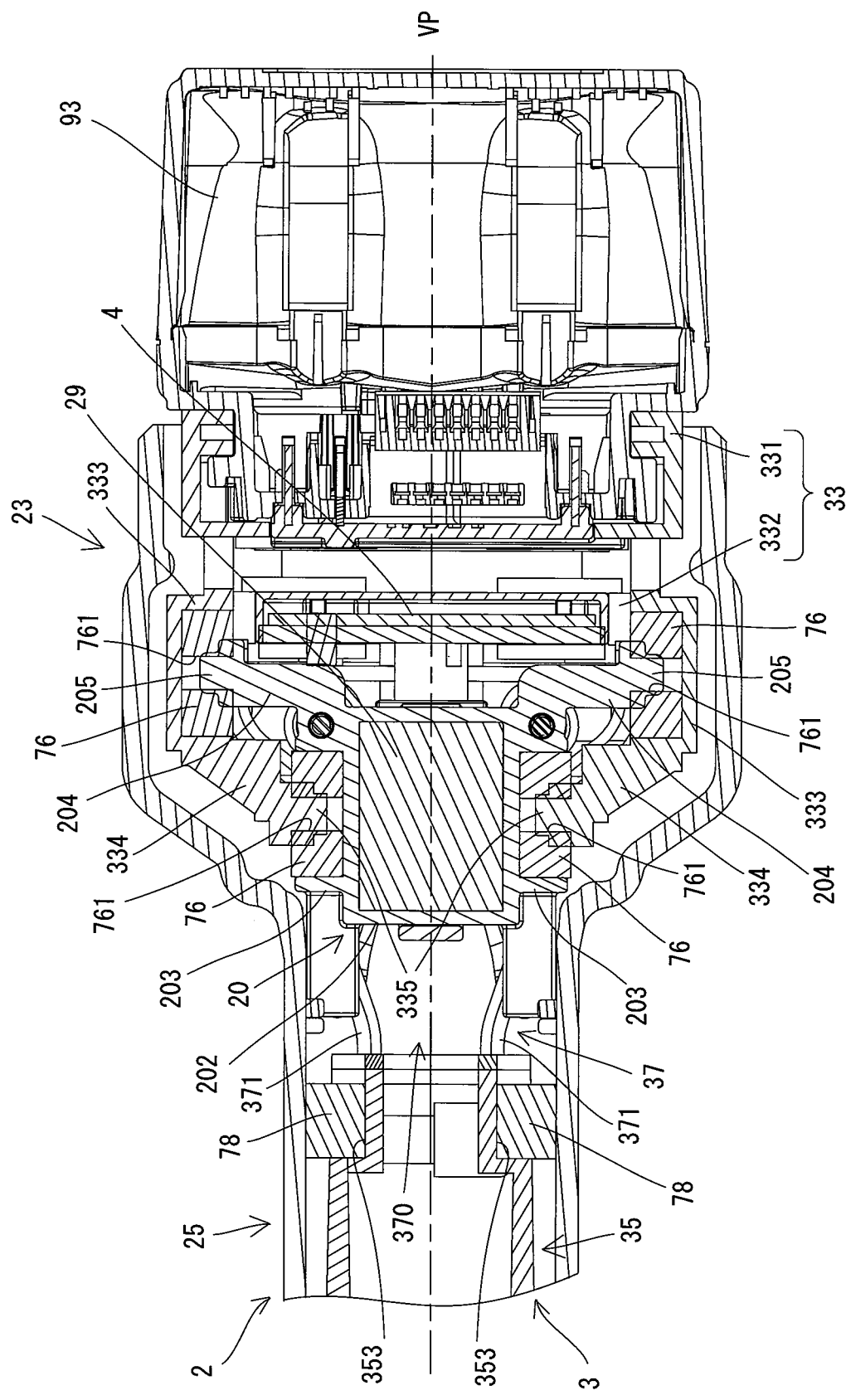
FIG. 12 is an enlarged view of a rear part in FIG. 3.

The internal configuration of the rear part 33 is now described. As shown in FIGS. 11 and 12, power receiving terminals and other components are disposed within the battery mounting part 331 which forms the rear-side half of the rear part 33. The power receiving terminals may be electrically connected to a power feeding terminal of the battery 93 when the battery 93 is engaged with the battery mounting part 331. The battery mounting part 331 and its internal configuration are well known and therefore not described here in detail. The control unit 4 is housed within the control unit housing part 332 which forms the front-side half of the rear part 33. In the present embodiment, the control unit 4 includes a board mounted with a CPU and switching elements. The CPU is configured to control driving of the motor 53. The switching elements are configured to operate according to a control signal from the CPU.

Figure 13:
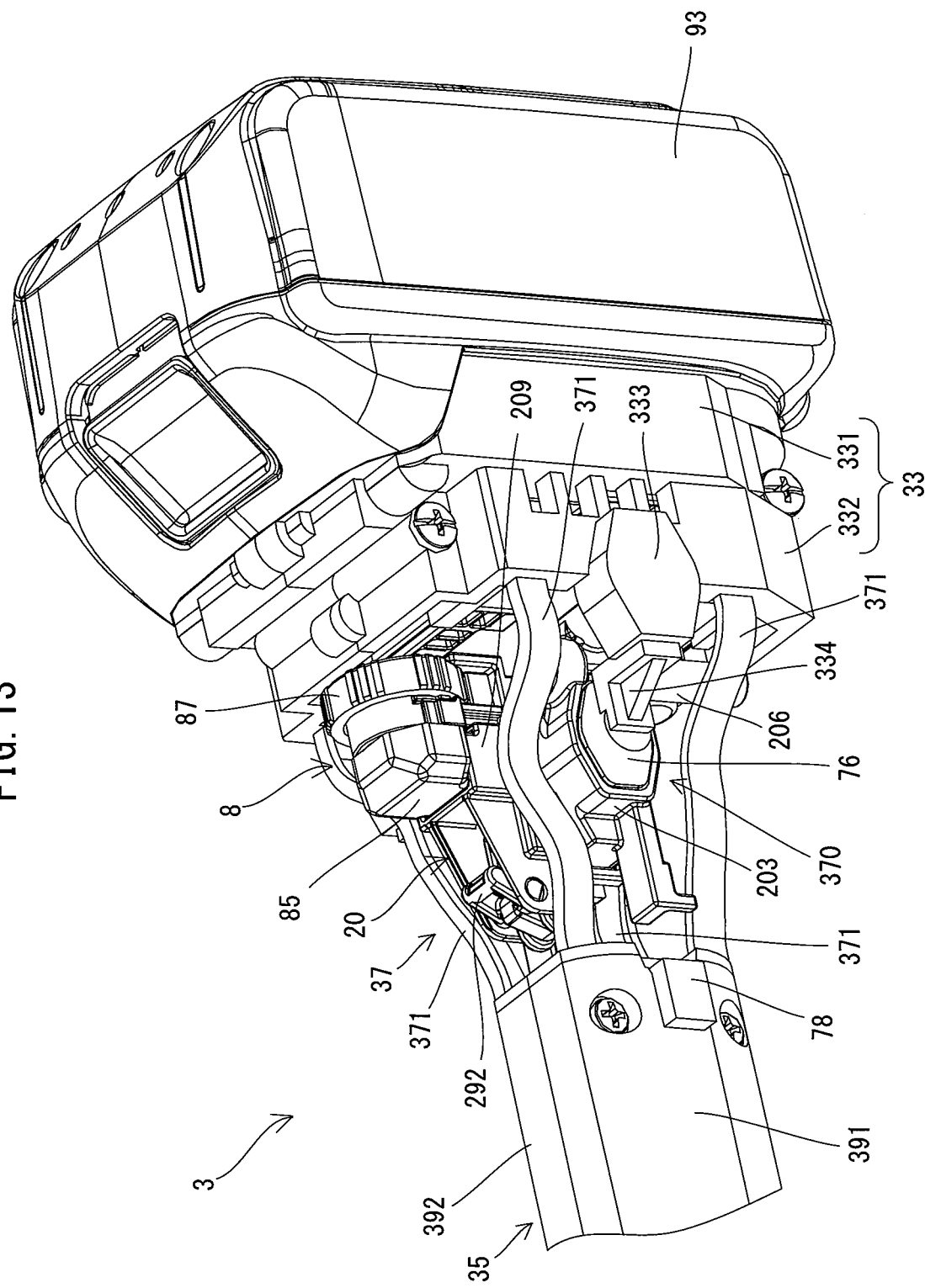
FIG. 13 is a perspective view of a rear part of the inner housing with a switch holder connected thereto.

The internal configuration of the elastic connection part 37 is now described. As shown in FIG. 13, the switch holder 20 is disposed within the internal space 370 (a space region surrounded by the elastic ribs 371 in the circumferential direction) of the elastic connection part 37. The switch holder 20 is a member that is configured to hold the switch 29. Further, in the present embodiment, the switch holder 20 also holds a speed-change dial unit 8 which will be described later. Although the switch holder 20 is disposed within the internal space 370 as described above, the switch holder 20 is fixed to the upper and lower shells 27, 28 with screws and constitutes a portion of the outer housing 2. Further, the switch holder 20 is elastically connected to the rear part 33 of the inner housing 3, which will be described later in detail.

The internal configuration of the extending part 35 is now described. As shown in FIGS. 2 and 3, in the present embodiment, the driving mechanism 5 (the spindle 51, the motor 53 and the transmitting mechanism 55) is disposed in the front part 31, and the battery mounting part 331 is disposed in the rear part 33. Therefore, the number of parts or components to be disposed in the extending part 35 can be minimized. A lead wire and a connecting terminal (which are not shown) for connecting boards of the control unit 4 and the motor 53 are disposed within the extending part 35, but no other component is particularly disposed in the extending part 35. Thus, the extending part 35 is formed thinner (has a smaller diameter) than the front part 31, the elastic connection part 37 and the rear part 33 such that the grip part 25 is easy to hold.

A structure of elastically connecting the outer housing 2 and the inner housing 3 is now described. In the present embodiment, the outer housing 2 and the inner housing 3 are connected via elastic members at a plurality of positions in the front-rear direction. Specifically, two front elastic members 71 are interposed between the front part 21 of the outer housing 2 and the front part 31 of the inner housing 3 (see FIG. 6). Further, four rear elastic members 76 are interposed between the switch holder 20 of the outer housing 2 and the rear part 33 of the inner housing 3 (see FIG. 12).

Figure 14:
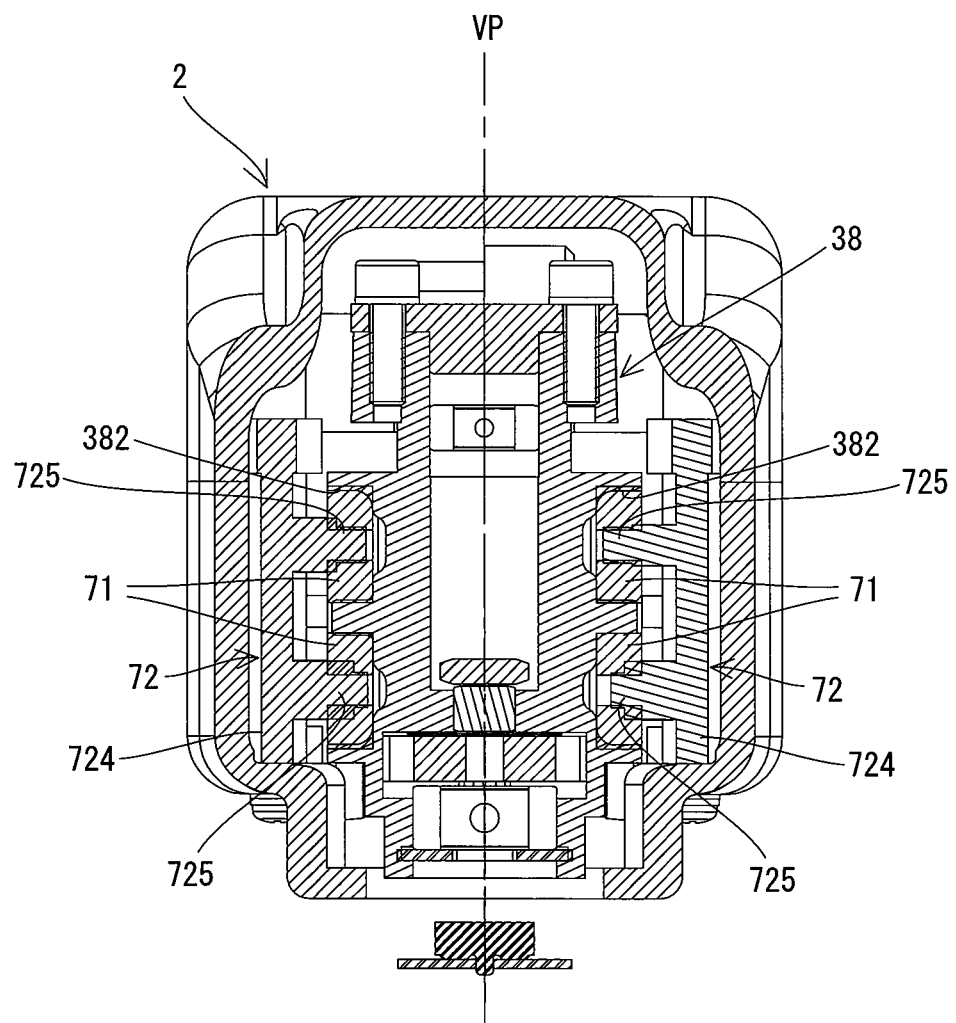
FIG. 14 is a sectional view taken along line XIV-XIV in FIG. 2.

First, the arrangement of the front elastic members 71 is described. As shown in FIG. 4, a recess 382 having an elliptical shape in side view is formed in a boundary region between the spindle housing part 381 and the motor housing part 383 of the metal housing 38. As shown in FIG. 14, two such recesses 382 are symmetrically formed on the right and left sides of the front part 31. The front elastic members 71 are fitted in the recesses 382. Each of the front elastic members 71 has three through holes 711 spaced apart from each other in the up-down direction. A projection is formed on a bottom of the recess 382 and fitted in the middle one of the through holes 711. In the present embodiment, the front elastic members 71 are made of a material having a microfoam structure (also referred to as a microcellular structure). For example, a urethane foam having the microfoam structure (urethane-based resin having the microfoam structure) may be employed. In the present embodiment, among such kinds of the urethane foams, microcellular polyurethane elastomer is employed. The microcellular polyurethane elastomer has especially superior vibration absorbability and durability.

In the present embodiment, the front elastic members 71 are connected to a connecting member 72 fixed to the outer housing 2. The connecting member 72 includes a generally U-shaped base part 721 (see FIG. 9) and a pair of circular cylindrical parts 724 (see FIG. 14). The cylindrical parts 724 extend from both end portions of the base part 721 in a direction that is orthogonal to the base part 721. The connecting member 72 is fixed to the outer housing 2, with the base part 721 disposed on a bottom of the lower shell 28 below the metal housing 38 and with the cylindrical parts 724 extending upward and facing the front elastic members 71.

Figure 15:
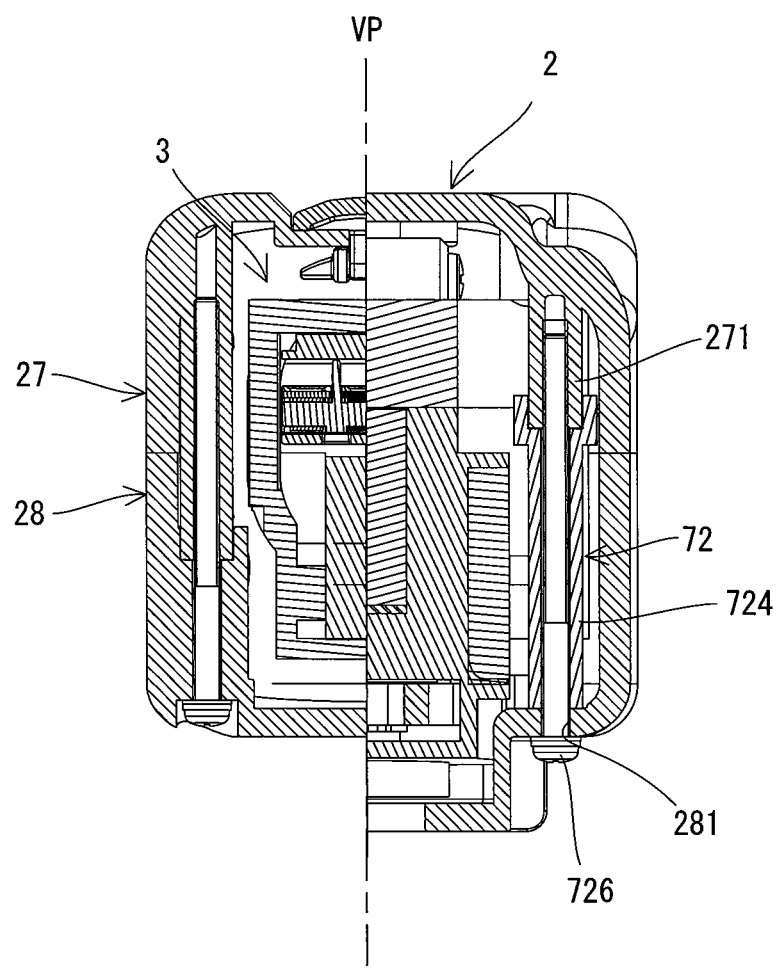
FIG. 15 is a sectional view taken along line XV-XV in FIG. 3.

Specifically, as shown in FIG. 15, a pair of through holes 281 are formed through the lower shell 28 in right and left front end portions of the front part 21 of the outer housing 2. A pair of downwardly extending circular cylindrical parts 271 are formed on the upper shell 27 at positions corresponding to the through holes 281 (only the left through hole 281 and the left cylindrical part 271 are shown in FIG. 15). Each of the cylindrical parts 271 has a female thread formed in its inner peripheral surface. The cylindrical part 271 of the upper shell 27 is fitted in a large-diameter part formed in an upper end portion of the cylindrical part 724 of the connecting member 72. Further, a screw 726 is inserted through the cylindrical part 724 via the through hole 281 from below and screwed into the cylindrical part 271. Thus, the connecting member 72 is fixed to the outer housing 2 and constitutes a portion of the outer housing 2.

The upper and lower shells 27, 28 are fixedly connected by screws not only via the cylindrical parts 271 in the right and left front end portions of the front part 21, but also in right and left rear end portions of the front part 21, as shown in FIG. 15 (only the right rear end portion is shown in FIG. 15).

As shown in FIG. 14, each of the cylindrical parts 724 of the connecting member 72 has two projections 725 protruding toward the inner housing 3. Ends of the projections 725 are respectively fitted in the upper and lower ones of the three through holes 711 (see FIG. 4) of the front elastic member 71. Each of the ends of the projections 725 is disposed apart from the bottom of the recess 382 while pressing the front elastic member 71 toward the bottom of the recess 382. The entire outer periphery of the projection 725 is covered with the front elastic member 71. Therefore, the projection 725 is allowed to relatively move within the recess 382 while compressing the front elastic member 71 in all of the up-down, front-rear and left-right directions. Thus, the front part 21 of the outer housing 2 is connected to the front part 31 of the inner housing 3 via the front elastic members 71 so as to be movable in all directions relative to the front part 31.

Figure 16:
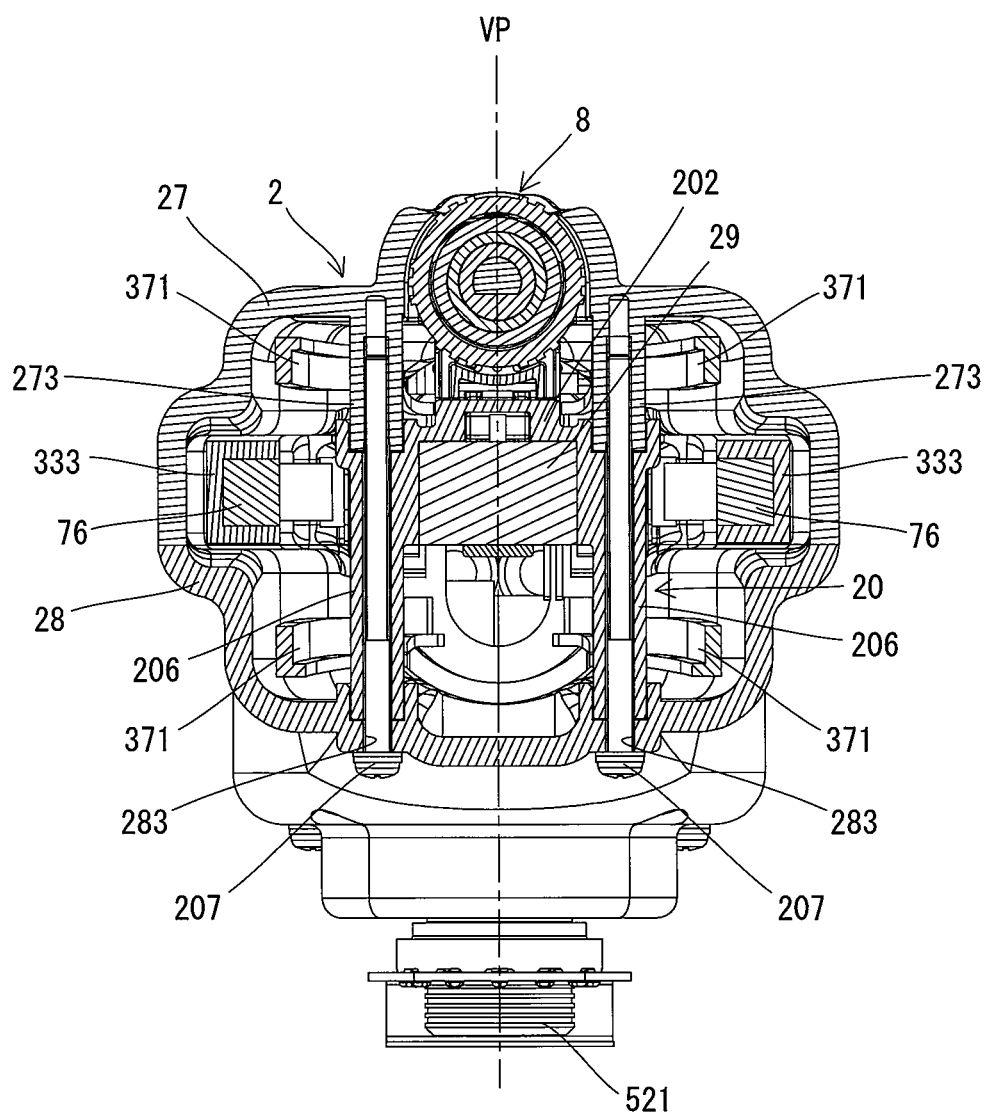
FIG. 16 is a sectional view taken along line XVI-XVI in FIG. 11.

The arrangement of the rear elastic members 76 is now described. As shown in FIGS. 12, 13 and 16, the switch holder 20 is disposed within the internal space 370 of the elastic connection part 37 of the inner housing 3. The switch holder 20 includes a body part 202, a pair of first holding parts 203, a pair of first aim parts 204 and a pair of circular cylindrical parts 206.

As shown in FIG. 12, the body part 202 houses the switch 29 and is disposed in the center of the internal space 370 in the left-right direction. The first holding parts 203 are disposed on the right and left sides of the body part 202. The right first holding part 203 has a recess opened to the right, and the left first holding part 203 has a recess opened to the left. The rear elastic members 76 are fitted in the recesses of the first holding parts 203. Each of the rear elastic members 76 has a through hole 761 in the center. As the rear elastic members 76, for example, urethane foam having a microfoam structure can be employed. In the present embodiment, like the front elastic members 71, the rear elastic members 76 are also made of microcellular polyurethane elastomer. The first arm parts 204 respectively extend to the right and left from right and left rear end portions of the body part 202. As shown in FIG. 16, the cylindrical parts 206 have a circular cylindrical shape and extend downward from the right and left rear end portions of the body part 202.

As shown in FIG. 12, the rear part 33 of the inner housing 3 includes a pair of second holding parts 333 and a pair of second arm parts 334. The second holding parts 333 are formed in right and left front end portions of the rear part 33. The second holding parts 333 are arranged to partially protrude forward of the control unit housing part 332. The left second holding part 333 has a recess open to the right (recessed to the left), and the right second holding part 333 has a recess open to the left (recessed to the right) such that the recesses are opposed to each other Like in the first holding parts 203, the rear elastic members 76 are fitted in the recesses of the second holding parts 333. The first arm parts 204 of the switch holder 20 are disposed in the inside (on the vertical plane VP side) of the rear elastic members 76 fitted in the second holding parts 333. Tips 205 of the first arm parts 204 are fitted in the through holes 761. The second arm parts 334 extend obliquely forward toward each other from the second holding parts 333. A projection 335 is formed on a leading end portion of each of the second arm parts 334 and protrudes toward the rear elastic member 76 fitted in the first holding part 203. The projection 335 is fitted in the through hole 761 of the rear elastic member 76 fitted in the first holding part 203.

In this manner, the first holding parts 203 and the first arm parts 204 of the switch holder 20 and the second holding parts 333 and the second arm parts 334 of the rear part 33 are alternately combined on the right and left sides of the switch holder 20. With this structure, compared with a structure in which one of the switch holder 20 and the rear part 33 has two holding parts for the rear elastic members 76 and the other has two arm parts whose tips are fitted in the rear elastic members 76, more compact arrangement can be realized with the four rear elastic members 76.

As described above, the openings are defined between the adjacent elastic ribs 371 in the circumferential direction and communicatively connect the internal space 370 and the outside. Therefore, as shown in FIG. 13, the switch holder 20 can be easily disposed in the internal space 370 through the openings between the elastic ribs 371. Further, in the present embodiment, portions of the switch holder 20 other than the body part 202 protrude out of the internal space 370 through the openings. In other words, the openings between the elastic ribs 371 are utilized as connection paths between the switch holder 20 and the rear part 33. Thus, after the switch holder 20 is disposed within the internal space 370, the switch holder 20 can be easily connected to the rear part 33 via the openings.

With the above-described structure, the switch holder 20 is connected to the rear part 33 via a first pair of the rear elastic members 76 on the right and left sides of the body part 202. The switch holder 20 is also connected to the rear part 33 via a second pair of the rear elastic members 76 on the right and left obliquely rearward of the body part 202. Further, the switch holder 20 is connected via the cylindrical parts 206 to the upper shell 27 and the lower shell 28 to form a portion of the outer housing 2.

Specifically, as shown in FIG. 16, a pair of right and left through holes 283 are formed through a lower surface of the lower shell 28 in the rear part 23 of the outer housing 2. A pair of right and left circular cylindrical parts 273 extending downward are formed on the upper shell 27 at positions corresponding to the through holes 283. Each of the cylindrical parts 271 has a female thread formed in its inner peripheral surface. The cylindrical part 273 of the upper shell 27 is fitted in a large-diameter part formed in an upper end portion of the cylindrical part 206 of the switch holder 20, and a screw 207 is inserted through the cylindrical part 206 via the through hole 283 from below and screwed into the cylindrical part 273. Thus, the switch holder 20 is fixed to the upper and lower shells 27, 28. When assembling the housing 1, the switch holder 20 is connected to the rear part 33 via the rear elastic members 76 and thereafter fixed to the upper and lower shells 27, 28. At this time, the openings between the elastic ribs 371 are also utilized as connection paths between the switch holder 20 and the outer housing 2. Thus, the switch holder 20, which is a portion of the outer housing 2, can be easily mounted in the internal space 370 of the elastic connection part 37.

As shown in FIG. 12, the tip 205 of each of the first arm parts 204 is disposed apart from a bottom of the recess of the second holding part 333 while pressing the rear elastic member 76 (of the second pair) toward the bottom. The projection 335 of each of the second arm parts 334 is disposed apart from a bottom of the recess of the first holding part 203 while pressing the rear elastic member 76 (of the first pair) toward the bottom. The entire outer peripheries of the tip 205 and the projection 335 are covered with the rear elastic members 76 (of the first and second pairs). Therefore, the tip 205 is allowed to relatively move within the recess of the second holding part 333 while compressing the rear elastic member 76 in all of the up-down, front-rear and left-right directions. Similarly, the projection 335 is allowed to relatively move within the recess of the first holding part 203 while compressing the rear elastic member 76 in all of the up-down, front-rear and left-right directions. Thus, the switch holder 20 constituting a portion of the outer housing 2 is connected to the rear part 33 of the inner housing 3 via the rear elastic members 76 so as to be movable in all directions relative to the rear part 33.

Further, as shown in FIG. 11, a switch lever 291 is connected to the switch 29. The switch lever 291 is configured to move a movable contact between an on position and an off opposition relative to a fixed contact in response to an operation of the slider 290 (see FIG. 2). The switch lever 291 includes a rotating part 292 which is rotatably supported by the switch holder 20. The rotating part 292 is rotatably connected to an actuation part (not shown) connected to the switch 29. As shown in FIG. 13, the rotating part 292 protrudes upward from the inner housing 3 through the opening formed between the two upper elastic ribs 371 without interference with the elastic ribs 371. As shown in FIG. 2, an upper end of the rotating part 292 is rotatably connected to one end of the interlocking part 293. The interlocking part 293 extends in the front-rear direction between the inner housing 3 and the outer housing 2 and is connected to the slider 290 at the other end. With such a structure, the switch lever 291 moves the movable contact between the on position and the off opposition relative to the fixed contact, in response to the operation of the slider 290.

In the present embodiment, the switch holder 20 is configured as a member for holding not only the switch 29 but also the speed-change dial unit 8. Specifically, as shown in FIG. 13, the speed-change dial unit 8 is fitted in a dial holding part 209 provided on a top of a rear-side portion of the switch holder 20. The speed-change dial unit 8 is disposed such that a rotation axis of a dial 87 (an axis A3 of a rotary shaft 822 to be described later) extends in the front-rear direction, and is held with its upper portion exposed upward from the dial holding part 209. When the switch holder 20 is fixed to the upper and lower shells 27, 28 as described above, as shown in FIG. 11, the outer periphery of the dial 87 is partly exposed to the outside of the outer housing 2 through a through hole 275 formed in an upper surface of the outer housing 2. The structure of the speed-change dial unit 8 will be described later in detail.

In addition to the front and rear elastic members 71, 76, as shown in FIG. 12, intermediate elastic members 78 are disposed between the outer housing 2 and the inner housing 3. More specifically, a pair of stepped parts 353 are formed in right and left rear end portions of the extending part 35. The stepped parts 353 are recessed inward in the left-right direction. The intermediate elastic member 78 having a rectangular parallelepiped shape is affixed to each of the stepped parts 353. In the present embodiment, the intermediate elastic members 78 are arranged with a slight clearance from the outer housing 2 (the grip part 25) in the left-right direction, and do not always elastically connect the extending part 35 and the grip part 25. Unlike the front and rear elastic members 71, 76, the intermediate elastic members 78 only cope with a movement in the left-right direction in which the spindle 51 reciprocally rotates, and restrict the movement of the inner housing 3 in the left-right direction relative to the outer housing 2. In the present embodiment, like the front elastic members 71, the intermediate elastic members 78 are also made of microcellular polyurethane elastomer.

Operation of the oscillating tool 100 is now described. The user attaches the tool accessory 91 for a desired operation to the tool mounting part 511, holds the grip part 25 and switches the slider 290 to the on position. Thus, the switch 29 is turned on via the switch lever 291. The control unit 4 (specifically, the CPU) starts driving of the motor 53 when the switch 29 is turned on. The control unit 4 sets the rotation speed of the motor 53 based on a resistance value that is set with the speed-change dial unit 8, which will be described later. When the motor 53 is driven, the spindle 51 reciprocally rotates around the axis A1 within the prescribed angle range and thereby oscillates the tool accessory 91 (generally in the left-right direction in the case of the blade shown in the drawings) within the oscillation plane OP. The user can cause the oscillating tool 100 to perform the operation on the workpiece by pressing the tool accessory 91 against the workpiece.

During the operation, relatively large vibrations are likely to occur in the front part 31 of the inner housing 3 which houses the driving mechanism 5. The largest and most dominant among such vibrations is the vibration in the oscillating direction of the tool accessory 91 oscillating within the oscillation plane OP. In the present embodiment, as shown in FIGS. 6 and 8, the contact part 387 of the metal housing 38 and the projections 394 of the resin housing 39 are connected in a state in which the first and second contact surfaces 380, 390, which extend in a direction crossing the oscillation plane OP, are held in contact with each other. Thus, the metal housing 38 and the resin housing 39 can be connected together while being effectively prevented from moving relative to each other in the oscillating direction. Further, due to the arrangement of the first and second contact surfaces 380, 390 crossing the oscillation plane OP, occurrence of a relative slippage between the first and second contact surfaces 380, 390 can be suppressed. Therefore, heat generation and occurrence of abnormal vibration which may be caused by the relative slippage can be effectively suppressed. As described above, in the inner housing 3 of the present embodiment, a simple and rational connecting structure can be realized.

In particular, in the present embodiment, the first and second contact surfaces 380, 390 are held in contact with each other in two contact regions, corresponding to the two projections 394. Therefore, compared with a structure having only one such contact region, the relative movement of the metal housing 38 and the resin housing 39 in the oscillating direction can be more reliably suppressed. Further, a structure of firmly connecting the contact part 387 and the left and right shells 391, 392 can be realized by fixing the contact part 387 held between the left and right shells 391, 392 with the screws 389.

Further, in the present embodiment, the upper end surface 384 of the motor housing part 383 and the lower end surface 312 of the motor cover part 311 (see FIG. 5) are mating surfaces parallel to the oscillation plane OP. However, since the relative movement of the metal housing 38 and the resin housing 39 in the oscillating direction is suppressed, the possibility of heat generation caused by sliding contact between the upper end surface 384 and the lower end surface 312 can be effectively reduced.

Further, as for the transmission of the vibration from the inner housing 3 to the outer housing 2, first, the front elastic members 71 (see FIG. 14) disposed between the recesses 382 of the metal housing 38 and the connecting member 72 fixed to the outer housing 2 can reduce the transmission of the vibration from the front part 31 to the outer housing 2 (to the grip part 25, in particular).

In the present embodiment, the spindle 51, the motor 53 and the transmitting mechanism 55, which are heavy members of the oscillating tool 100, are all disposed in the front part 31, while the correspondingly heavy battery 93 is mounted to the battery mounting part 331 formed in the rear part 33. With this structure, compared with a structure in which the battery mounting part 331 is formed in the vicinity of the front part 31, when the battery 93 is mounted, the moment of inertia of the inner housing 3 is increased. The increase in the moment of inertia of the inner housing 3 leads to less vibration caused in the inner housing 3. Further, even if a certain degree of load is applied to the tool accessory 91, the inner housing 3 can be prevented from unnecessarily rotating around the spindle 51 relative to the outer housing 2.

Further, the elastic ribs 371 (see FIG. 13) connecting the extending part 35 and the rear part 33 can reduce the transmission of the vibration from the front part 31 to the rear part 33, which contributes to a protection of the electrical components such as terminals of the battery mounting part 331 and the battery 93. Particularly, by providing the elastic ribs 371 having the smaller elastic modulus than the extending part 35 and the rear part 33, the transmission of the vibration from the extending part 35 to the rear part 33 can be reduced further effectively. Further, with the structure in which two of the elastic ribs 371 are formed on each of the left and right parts (the left and right shells 391, 392) of the extending part 35, the extending part 35 and the rear part 33 can be connected in a state stable in the left-right direction.

Further, the rear part 33 is connected to a portion (the switch holder 20) of the outer housing 2 via the rear elastic members 76 (see FIG. 12). The vibration transmitted to the rear part 33 is reduced by the elastic ribs 371, as compared with the vibration caused in the front part 31. Therefore, with the structure in which the rear part 33 is connected to the outer housing 2 via the rear elastic members 76, the transmission of the vibration to the outer housing 2 can be reduced, as compared with a structure in which a different portion of the inner housing 3 (such as the extending part 35) is connected to the outer housing 2. Further, with the structure in which, in addition to the front part 31, the rear part 33 having the battery mounting part 331 is also elastically connected to the outer housing 2, the positional relation between the outer housing 2 and the battery 93 can be stabilized. Particularly, in the present embodiment, one of the front elastic members 71 and two of the rear elastic members 76 are disposed on each of the right and left sides of the inner housing 3, so that the positional relation can be stabilized further reliably.

In the present embodiment, the switch holder 20, which is a portion of the outer housing 2 which is connected to the rear part 33, is disposed in the internal space 370 of the elastic connection part 37. With this structure, while effectively utilizing the internal space 370, the switch 29, which is an electrical component, can be supported by the outer housing 2 which has less vibration than the inner housing 3. Further, the switch holder 20 is also utilized as a member for holding the speed-change dial unit 8, which is also an electrical component, so that the speed-change dial unit 8 can be efficiently held by the outer housing 2 without increasing the number of components.

The intermediate elastic members 78 disposed on the right and left sides of the rear end portion of the extending part 35 can prevent the inner housing 3 from rotating around the spindle 51 in the left-right direction relative to the outer housing 2 when an excessive load is applied to the tool accessory 91. Thus, it can be prevented that the inner housing 3 comes into contact with the outer housing 2 to increase the transmission of the vibration to the outer housing 2. Therefore, the user can comfortably perform an operation using the oscillating tool 100 provided with the effective vibration reducing measures as described above.

Figure 17:
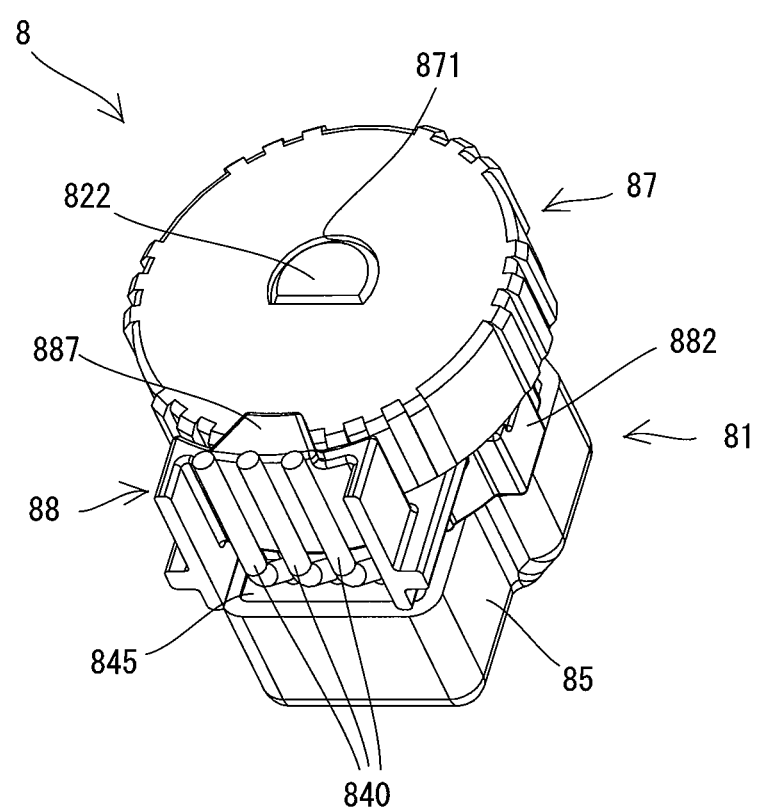
FIG. 17 is a perspective view of a speed-change dial unit.
Figure 18:
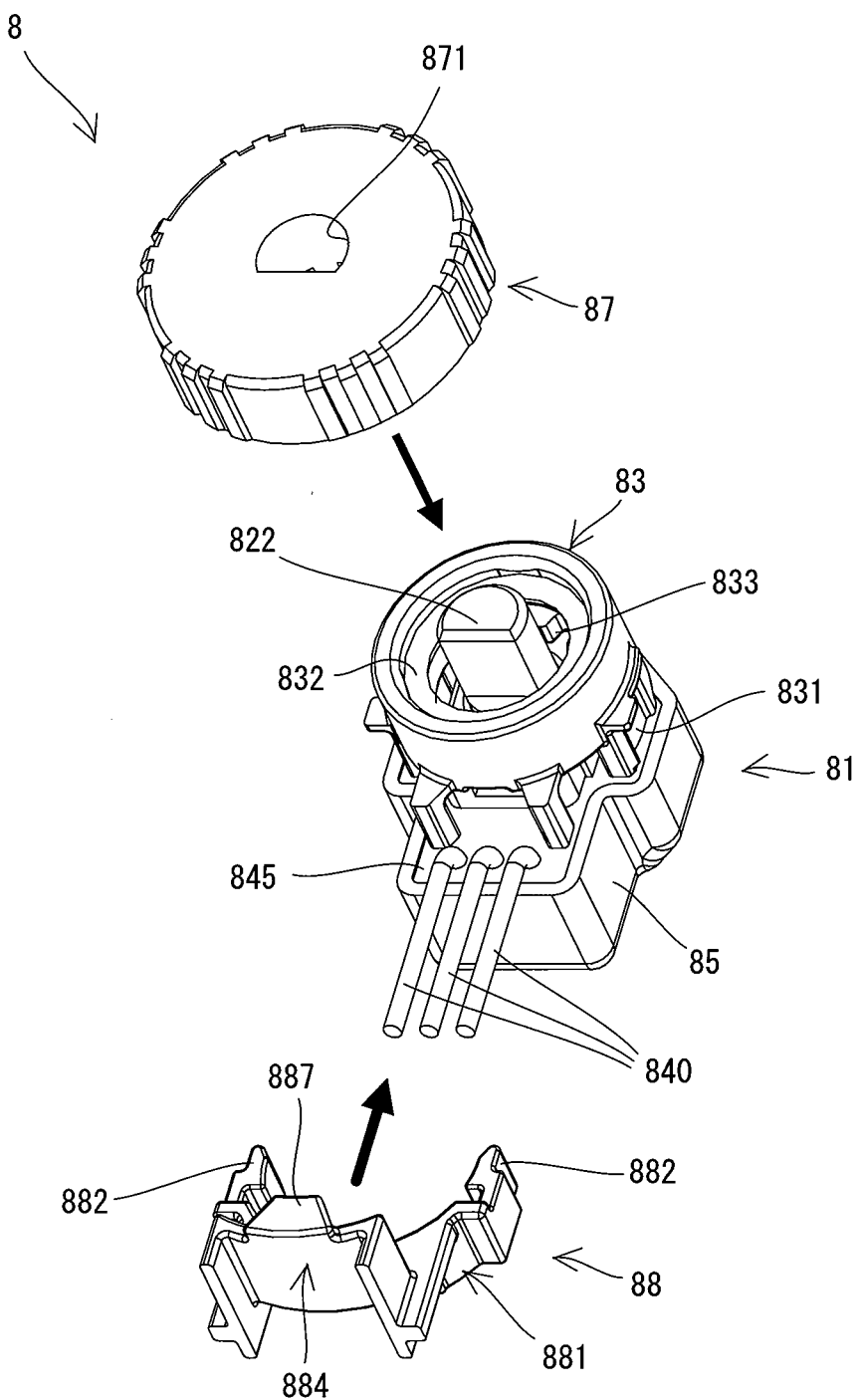
FIG. 18 is an exploded perspective view of the speed-change dial unit.

The structure of the speed-change dial unit 8 is now described. The speed-change dial unit 8 is configured as an operation device for steplessly setting the rotation speed of the motor 53 in response to the turning operation of the dial 87 by the user. As shown in FIGS. 17, and 18, the speed-change dial unit 8 includes a body part 81, the dial 87, lead wires 840 and a partition 88, which are now described one by one.

Figure 19:
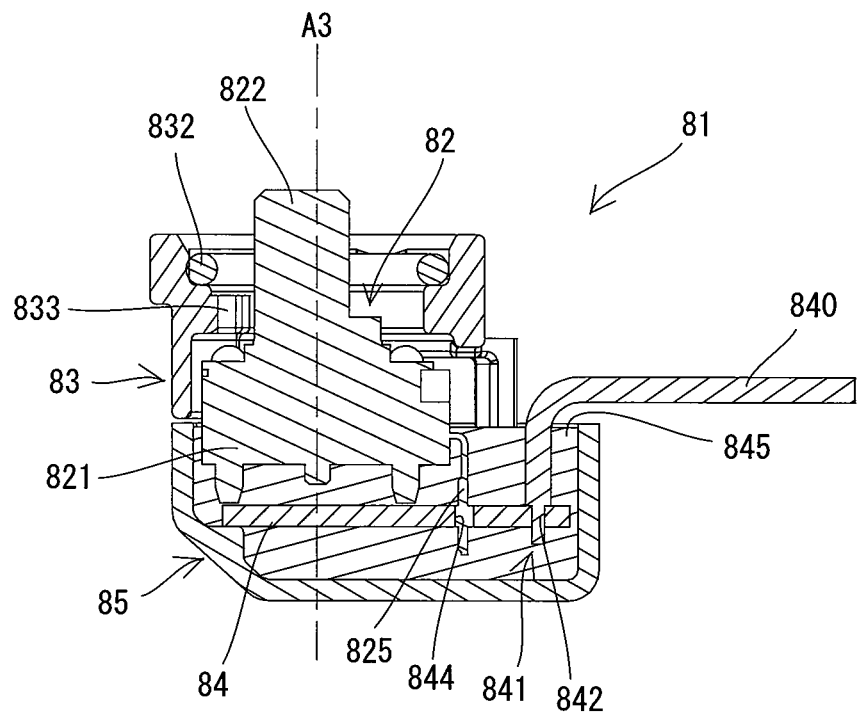
FIG. 19 is a longitudinal section view of a body.

As shown in FIG. 19, in the present embodiment, the body part 81 includes a variable resistor 82, a collar 83, a circuit board 84 and a case 85.

The variable resistor 82 is configured as a rotary variable resistor having a well-known structure, and therefore briefly described here. The variable resistor 82 includes a body 821 having a built-in resistor and a rotary shaft 822. The rotary shaft 822 has a movable contact and protrudes from the body 821 in the direction of the axis A3 (In FIG. 19, the whole variable resistor 82 having the body 821 and the rotary shaft 822 is schematically shown as one body). The variable resistor 82 is configured such that, when the rotary shaft 822 is rotated around the axis A3, the movable contact slides on the resistor built in the body 821 and its resistance value changes according to the position of contact between the movable contact and the resistor. The rotary shaft 822 has a D-shaped section orthogonal to the axis A3 (see FIG. 18).

In the description below, relating to the directions of the speed-change dial unit 8 which is not mounted to the oscillating tool 100, the axis A3 direction is defined as an up-down direction. In the up-down direction, the protruding end side of the rotary shaft 822 and the body 821 side are respectively defined as an upper side and a lower side.

Figure 20:
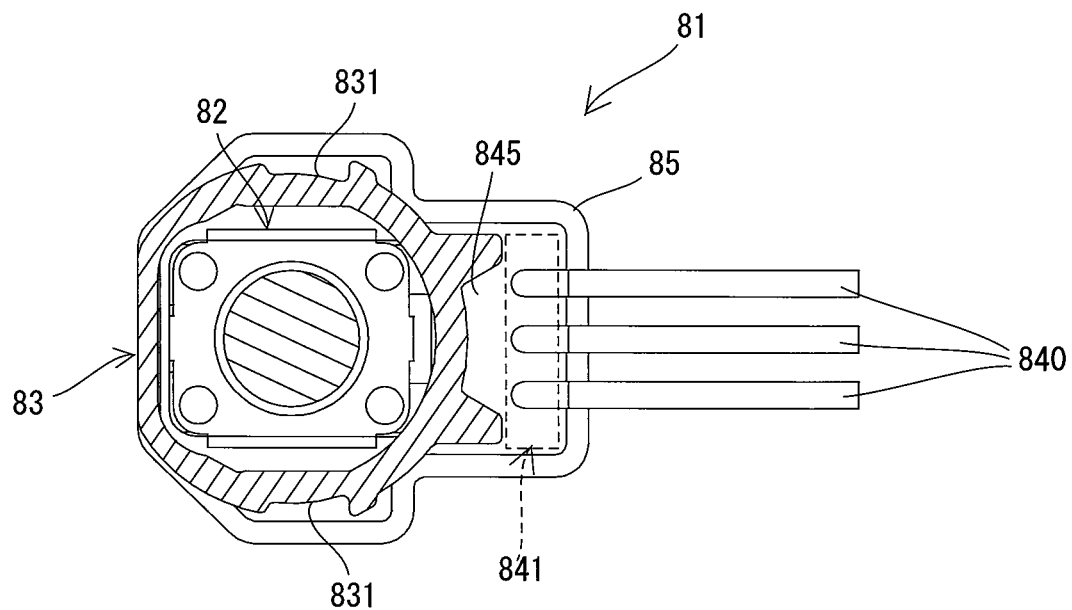
FIG. 20 is a cross section view of the body.

As shown in FIGS. 18 to 20, the collar 83 has an annular shape and is disposed around the variable resistor 82 and coaxially with the axis A3 of the rotary shaft 822. The collar 83 is configured such that the partition 88 described below can be mounted thereto. Specifically, a pair of engagement recesses 831 are formed in an outer periphery of the collar 83 for engagement with a pair of engagement arms 882 of the partition 88. The engagement between the partition 88 and the collar 83 will be described later. A recess is formed in a portion of an inner periphery of the collar 83 which surrounds the rotary shaft 822, and an O-ring 832 is fitted in the recess. The O-ring 832 is configured to allow the user to steplessly turn the dial 87 while holding the dial 87 by frictional resistance. A restricting piece 833 is provided below the O-ring 832 on the collar 83. The restricting piece 833 protrudes radially inward from a portion of the inner periphery of the collar 83. The restricting piece 833 is configured to restrict rotation of the dial 87 by contact with a projection 872 (see FIG. 22) of the dial 87.

The circuit board 84 shown in FIG. 19 has a generally rectangular shape and includes a wire connecting region 841 in one end region in its longitudinal direction. The wire connecting region 841 is a region that includes connection holes 842 to which the lead wires 840 are connected. In the present embodiment, corresponding to the number of terminals 825 of the variable resistor 82, three connection holes 842 are formed in the circuit board 84. The lead wires 840 are inserted into the connection holes 842 and soldered to the circuit board 84, thereby being electrically connected to the circuit board 84. The variable resistor 82 and the collar 83 are fixed to another region of the circuit board 84 that is different from the wire connecting region 841. The terminals 825 of the variable resistor 82 are inserted into connection holes 844 of the circuit board 84 and soldered, thereby being electrically connected to the lead wires 840 soldered to the connection holes 842 of the wire connecting region 841. When a direction (an up-and-down direction in FIG. 20) orthogonal to the up-down direction of the speed-change dial unit 8 and to the longitudinal direction of the circuit board 84 is defined as a left-right direction of the speed-change dial unit 8, the above-described two engagement recesses 831 are symmetrically arranged with respect to a center line of the collar 83 in the left-right direction when the collar 83 is fixed to the circuit board 84.

The case 85 has a box-like shape having an open top. The case 85 is configured to house the variable resistor 82, the collar 83 and the circuit board 84. The lead wires 840, the variable resistor 82 and the collar 83 are arranged to protrude in the same direction from the same side of the circuit board 84. The circuit board 84 is disposed within the case 85, with the lead wires 840, the variable resistor 82 and the collar 83 protruding upward from the open top of the case 85. The circuit board 84 with the lead wires 840, the variable resistor 82 and the collar 83 is sealed with resin 845 (typically, epoxy resin) poured into the case 85.

Figure 21:
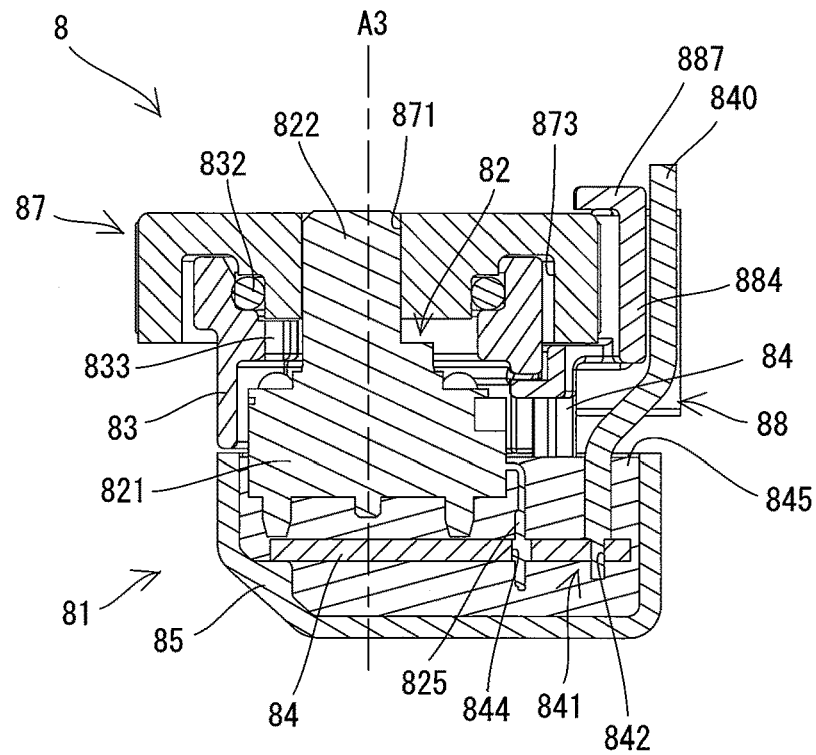
FIG. 21 is a longitudinal section view of the speed-change dial unit.
Figure 22:
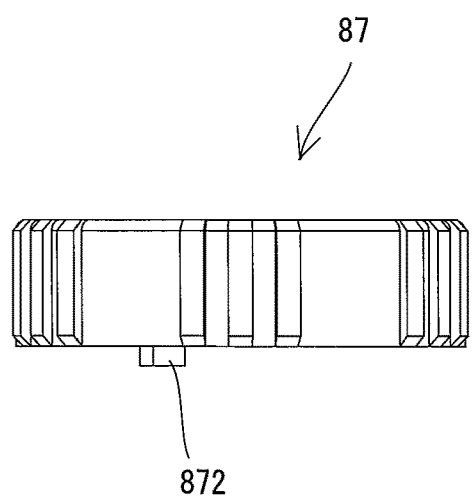
FIG. 22 is a side view of a dial.

As shown in FIGS. 17, 21 and 22, the dial 87 is a disc-like member which can be turned by the user. The dial 87 has a central fitting hole 871 having a D-shaped section corresponding to the rotary shaft 822. The dial 87 is fitted and mounted onto the rotary shaft 822 in the axis A3 direction. A stepped recess 873 recessed upward and having an annular shape around the axis A3 is formed in a lower surface of the dial 87. An upper end portion of the collar 83 is inserted in the stepped recess 873. The O-ring 832 is disposed between the collar 83 and a lower central portion of the dial 87. When the dial 87 is turned, the dial 87 and the rotary shaft 822 are rotated together around the axis A3, while the lower central portion of the dial 87 slides in contact with the O-ring 832. As a result, the resistance value of the variable resistor 82 is changed. The projection 872 (see FIG. 22) is provided on the lower central portion of the dial 87 and protrudes downward toward the variable resistor 82. When the dial 87 is turned to a position at which the projection 872 comes into contact with the restricting piece 833 formed on the collar 83, the dial 87 is prevented from being further turned. Thus, the turning range of the dial 87 is restricted to a certain angle range by the restricting piece 833 and the projection 872.

Figure 23:
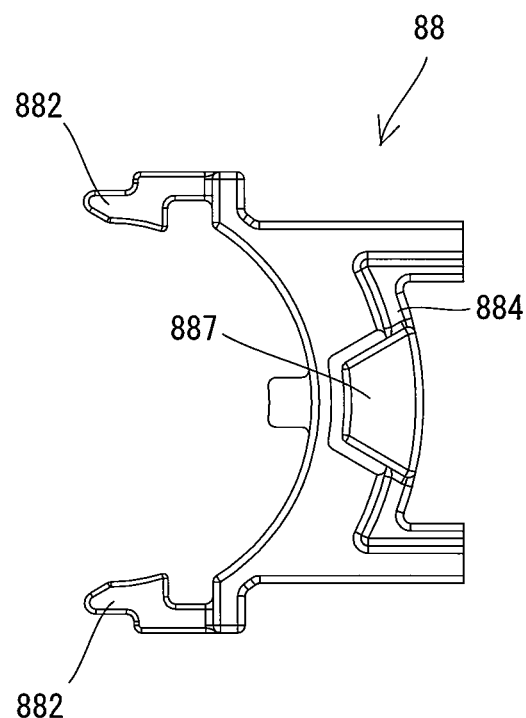
FIG. 23 is a plan view of a partition.
Figure 24:
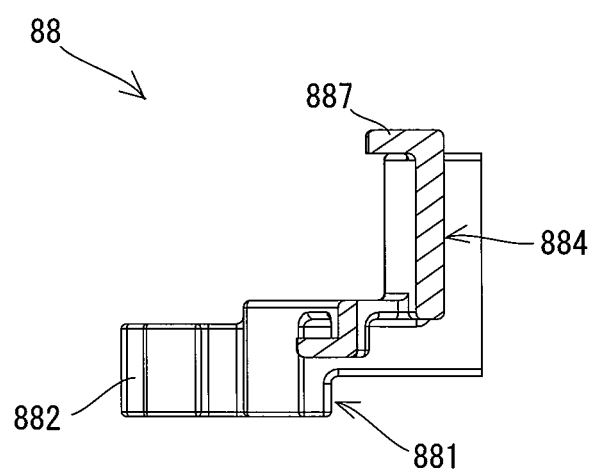
FIG. 24 is a side view of the partition.
Figure 25:
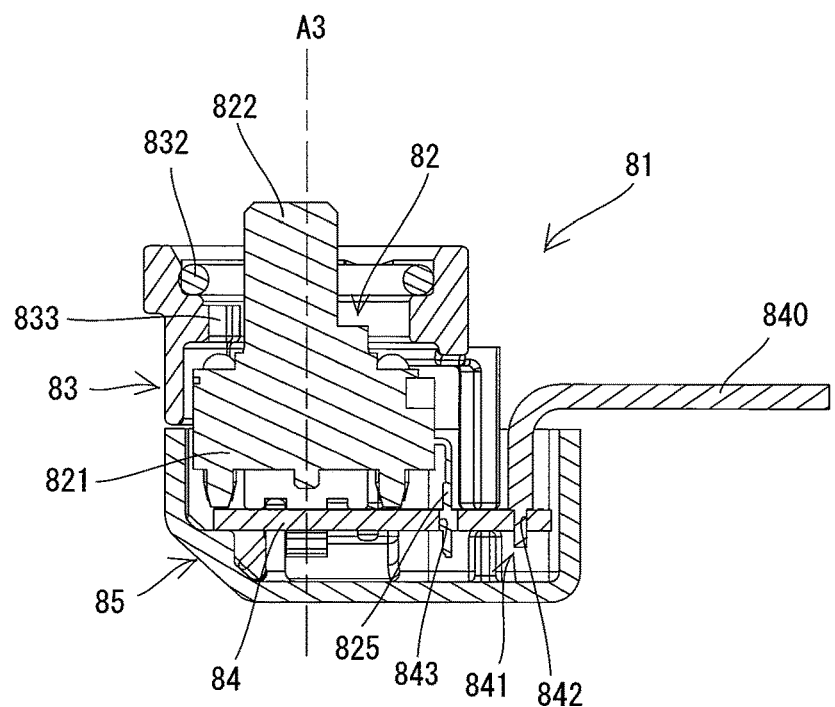
FIG. 25 is a longitudinal section view of the body into which resin is not yet injected.
Figure 26:
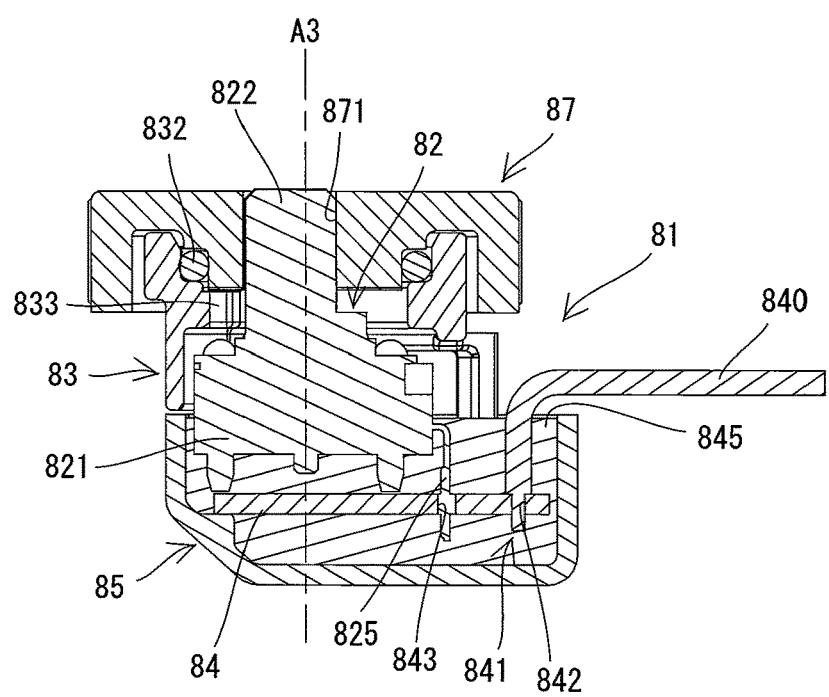
FIG. 26 is a longitudinal section view of the body with the dial mounted thereto.

The partition 88 is a wall portion that is configured to prevent contact between the dial 87 and the lead wires 840 connected to the wire connecting region 841. Further, in the present embodiment, the partition 88 is configured to be removably mounted to the collar 83. As shown in FIGS. 18, 23 and 24, the partition 88 includes a mounting part 881, an intervening part 884 and a stopper part 887.

The mounting part 881 is a lower portion of the partition 88. The mounting part 881 is arranged along the outer periphery of the collar 83. Both end portions of the mounting part 881 in the circumferential direction of the collar 83 are configured as a pair of flexible engagement arms 882. The engagement arms 882 can elastically deform in the radial direction of the collar 83. The partition 88 is mounted onto the body part 81 (specifically, the collar 83) with claws formed in tips of the engagement arms 882. The claws of the engagement arms 882 can be engaged with the engagement recesses 831 by elastic deformation of the engagement arms 882.

The intervening part 884 is an upper portion of the partition 88. The intervening part 884 extends upward from the mounting part 881. The intervening part 884 is disposed between the outer periphery of the dial 87 and the lead wires 840 so as to prevent contact between the dial 87 and the lead wires 840. The intervening part 884 extends outward in the radial direction of the dial 87 from the mounting part 881 along the lower surface of the dial 87, and then extends up to an upper end of the dial 87 along the outer periphery of the dial 87. The portion of the intervening part 884 which is arranged along the outer periphery of the dial 87 includes circumferential end portions protruding in a direction away from the dial 87. When viewed from the extending direction of the axis A3 of the rotary shaft 822 (that is, when viewed from above or below), the intervening part 884 is arranged to overlap with the wire connecting region 841 of the circuit board 84. In the present embodiment, the dial 87 is also arranged to overlap with the wire connecting region 841. In other words, the intervening part 884 and the dial 87 are both arranged to be at least partially located right above the wire connecting region 841.

As shown in FIG. 21, the lead wires 840 connected to the connection holes 842 and sealed with the resin 845 within the case 85 extend upward from the wire connecting region 841 and are exposed from the resin 845. Above this region, the intervening part 884 of the partition 88 extends along the lower surface and the outer periphery of the dial 87. Therefore, even if the lead wires 840 are apt to extend directly upwards, the intervening part 884 stands between the lead wires 840 and the dial 87, so as to prevent contact therebetween. As a result, the lead wires 840 are curved below the intervening part 884 and extends along the outer periphery of the intervening part 884. The circumferential end parts of the intervening part 884 which is arranged along the outer periphery of the dial 87 function as a guide part for guiding the lead wires 840 not to deviate in the left-right direction (see FIG. 17).

The stopper part 887 protrudes toward the axis A3 (inward in the radial direction of the dial 87) from the upper end of the intervening part 884 and is arranged slightly above the upper surface of the dial 87. This structure restricts a movement of the dial 87 fitted onto the rotary shaft 822 in the upward direction (the protruding direction of the rotary shaft 822). In other words, the stopper part 887 prevents the dial 87 from slipping off from the rotary shaft 822.

With the speed-change dial unit 8 having the above-described structure, the partition 88 (particularly, the intervening part 884) arranged to prevent contact between the dial 87 and the lead wires 840 can protect the lead wires 840. Further, in the present embodiment, considering that a dead space tends to be formed on the circuit board 84 side in the direction of the rotation axis of the dial 87 (the axis A3 direction), the wire connecting region 841 is arranged to overlap with at least one of the dial 87 and the partition 88 in the axis A3 direction. With this arrangement, as shown in FIG. 21, the partition 88 can protect the lead wires 840 by preventing contact between the dial 87 and the lead wires 840, while the lead wires 840 are allowed to pass through the dead space. Thus, the structure of protecting the lead wires 840 can be provided while avoiding an increase in the size of the speed-change dial unit 8.

Further, the speed-change dial unit 8 can be manufactured by a manufacturing (assembling) method, specifically including the following first to fifth processes. In the first process, the circuit board 84 having the variable resistor 82 and the collar 83 mounted thereon and having the lead wires 840 connected to the wire connecting region 841 is disposed in the case 85 having the open top (see FIG. 25). In the second process, the resin 845 in an uncured state is poured into the case 85 from the open top of the case 85 at least up to a level to cover connecting parts of the lead wires 840 to the wire connecting region 841 as well as connecting parts of the terminal 825 of the variable resistor 82 (see FIG. 19). In the third process, the resin 845 is cured. In the fourth process, the rotary shaft 822 of the variable resistor 82 is fitted in the fitting hole 871 of the dial 87, so that the dial 87 is mounted to the rotary shaft 822 (see FIGS. 18 and 26). In the fifth process, the engagement arms 882 are engaged with the engagement recesses 831 by utilizing the elastic deformation, so that the partition 88 is mounted to the collar 83 from the lateral side (see FIGS. 17, 18 and 21).

According to this method, when the lead wires 840 are connected to the connection holes 842 in a previous stage of the first process, a space for the connecting operation (typically, a space for installing a soldering device) is required in the vicinity of the wire connecting region 841. Further, when the resin 845 is poured into the case 85 from the open top in the second process, a space for installing a device for pouring the resin 845 is required above the case 85. In the present embodiment, in the previous stage of the first process and in the second process, the dial 87 and the partition 88 are not yet mounted to the body part 81. Therefore, a sufficient free space is secured above the wire connecting region 841, so that the required operations can be easily performed.

Further, in the fifth process, the partition 88 including the intervening part 884 which prevents contact between the dial 87 and the lead wires 840 can be mounted to the body part 81 simply by engaging the engagement arms 882 with the engagement recesses 831 while elastically deforming the engagement arms 882. Further, the dial 87 can be integrally rotatably connected to the rotary shaft 822 while being prevented from slipping off from the rotary shaft 822, simply by fitting the rotary shaft 822 in the fitting hole 871 of the dial 87 in the fourth process and mounting the partition 88 from the lateral side by utilizing elastic deformation of the engagement arms 882 in the fifth process. Therefore, both the dial 87 and the partition 88 can be mounted to the body part 81 without using fasteners such as screws. Thus, working efficiency in assembling the speed-change dial unit 8 can be improved and the cost for the part (components) can be reduced.

Correspondences between the features of the embodiment and the features of the invention are as follows. The oscillating tool 100 is an example that corresponds to the "work tool" according to the present invention. The outer housing 2 and the inner housing 3 are examples that correspond to the "outer housing" and the "inner housing", respectively, according to the present invention. The motor 53, the output shaft 531 and the axis A2 are examples that correspond to the "motor", the "output shaft" and the "first axis", respectively, according to the present invention. The spindle 51 and the axis A1 are examples that correspond to the "spindle" and the "second axis", respectively, according to the present invention. The transmitting mechanism 55 is an example that corresponds to the "transmitting mechanism" according to the present invention. The front part 31, the rear part 33, the extending part 35 and the elastic connection part 37 of the inner housing 3 are examples that correspond to the "first end part", the "second end part", the "extending part" and the "elastic connection part", respectively, according to the present invention. The front elastic member 71 is an example that corresponds to the "first elastic member" according to the present invention. The battery mounting part 331 is an example that corresponds to the "power-source-related device" and the "battery mounting part" according to the present invention. The battery 93 is an example that corresponds to the "battery" according to the present invention. The four elastic ribs 371 are an example that corresponds to the "plurality of second elastic members" according to the present invention.

The grip part 25 is an example that corresponds to the "grip part" according to the present invention. The rear elastic member 76 is an example that corresponds to the "third elastic member" according to the present invention. The internal space 370 is an example that corresponds to the "internal space of the elastic connection part" according to the present invention. The switch holder 20 is an example that corresponds to the "portion of the outer housing which is disposed within the internal space" and the "switch holding member" according to the present invention. The upper shell 27 and the lower shell 28 are examples that correspond to the "cover part of the outer housing which covers the inner housing" according to the present invention. The left shell 391 and the right shell 392 are examples that correspond to the "left part" and the "right part", respectively, according to the present invention. The intermediate elastic member 78 is an example that corresponds to the "fourth elastic member" according to the present invention.

Second Embodiment

Figure 27:
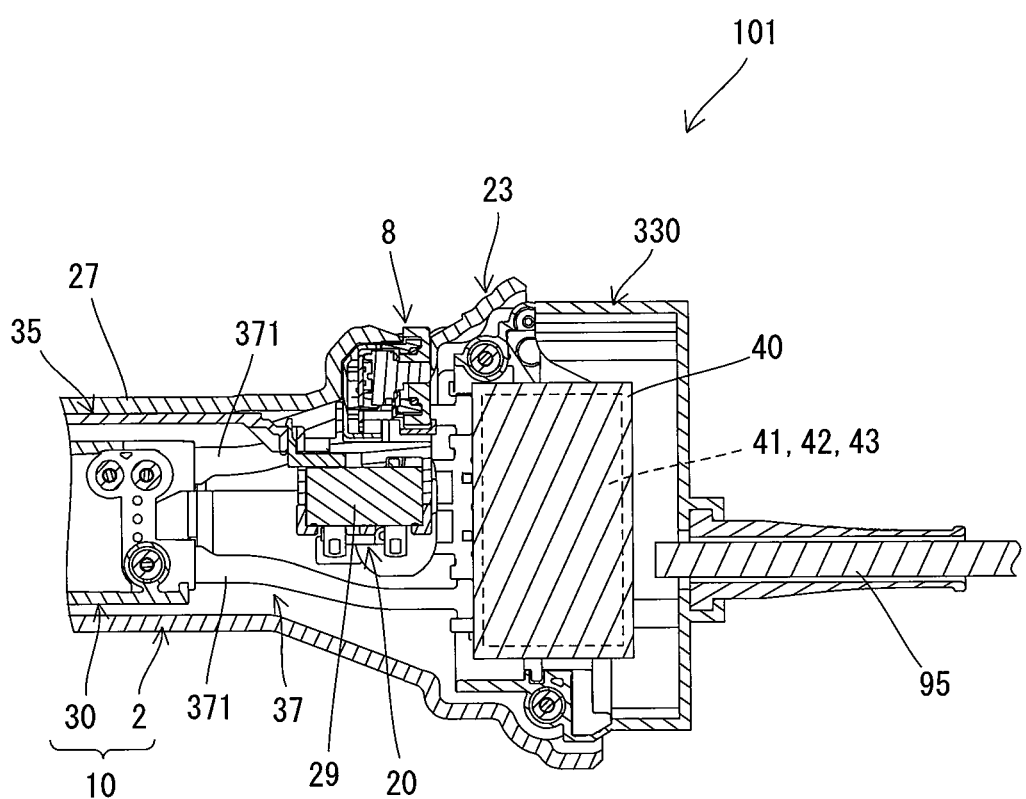
FIG. 27 is a sectional view of part of an oscillating tool according to a second embodiment.

An oscillating tool 101 according to a second embodiment is now described with reference to FIG. 27. Like the oscillating tool 100 of the first embodiment (see FIG. 2), the oscillating tool 101 of the present embodiment is also configured to reciprocally rotate the spindle 51 within the prescribed angle range around the axis A1 by power of the motor 53 configured as a brushless DC motor. The oscillating tool 101 is, however, configured to use an external alternate current (AC) power source (commercial power supply), in place of the battery 93 mounted to the battery mounting part 331. Therefore, a rear part 330 of an inner housing 30 of the oscillating tool 101 and its internal configuration are different from the rear part 33 and its internal configuration of the first embodiment. The other structures of the oscillating tool 101 are generally identical to the oscillating tool 100 of the first embodiment. Therefore, the structures which are generally identical to those in the first embodiment are given the same numerals as in the first embodiment and are not described or shown, or only briefly described or shown, and the different points are mainly described below.

The oscillating tool 101 includes a housing 10 configured as a vibration-isolating housing, like the housing 1 of the oscillating tool 100. The housing 10 includes the elongate outer housing 2 and an elongate inner housing 30 housed in the outer housing 2. The inner housing 30 includes the front part 31, the extending part 35, the elastic connection part 37 (the four elastic ribs 371) (see FIG. 2) and a rear part 330 (see FIG. 27).

In the above-described first embodiment, the battery mounting part 331 (see FIG. 2) is provided in the rear part 33 as a power-source-related device for enabling the power supply from the battery 93 to the motor 53. On the other hand, in the present embodiment, a power-source-related device is provided in the rear part 330 to enable power supply from the external AC power source to the motor 53. Specifically, as shown in FIG. 27, a power cable 95 that is connectable to the AC power source extends from a rear end of the rear part 330. Further, an AC-DC converter 41 is disposed within the rear part 330. The AC-DC converter 41 is configured to convert alternating current into direct current and connected to the power cable 95.

In the present embodiment, the AC-DC converter 41 forms a control unit 40 together with a three-phase inverter 42 and a CPU 43. The three-phase inverter 42 is configured to convert the direct current into alternating current to drive the motor 53 by using switching elements. The CPU 43 is configured to control driving of the motor 53 via the three-phase inverter 42. The AC-DC converter 41 is the heaviest among the components of the control unit 40. The weight of the AC-DC converter 41 in the present embodiment is generally equal to the weight of the battery 93 of the first embodiment. At least one of the three-phase inverter 42 and the CPU 43 may be disposed not within the rear part 330, but in the vicinity of the motor 53.

In the present embodiment, the spindle 51, the motor 53 and the transmitting mechanism 55, which are heavy members of the oscillating tool 101, are all disposed in the front part 31, while the correspondingly heavy AC-DC converter 41 is disposed in the rear part 33. Further, in the present embodiment, in addition to the AC-DC converter 41, the three-phase inverter 42 and the CPU 43 are disposed within the rear part 330, so that the weight of the internal structure of the rear part 330 is further increased. The moment of inertia of the inner housing 30 can be increased by such a structure, as in the case of the structure of the first embodiment with the battery 93 mounted to the rear part 33. Consequently, the vibration caused in the inner housing 30 can be reduced. Further, even if a certain degree of load is applied to the tool accessory 91, the inner housing 30 can be prevented from unnecessarily rotating around the spindle 51 relative to the outer housing 2.

In the present embodiment, the oscillating tool 101 is an example embodiment that corresponds to the "work tool" according to the present invention. The inner housing 30 is an example that corresponds to the "inner housing" according to the present invention. The rear part 330 is an example that corresponds to the "second end part" according to the present invention. The power cable 95 and the AC-DC converter 41 are examples that correspond to the "power-source-related device" according to the present invention. Further, the power cable 95 and the AC-DC converter 41 are examples that correspond to the "cable" and the "converter", respectively, according to the present invention. The three-phase inverter 42 and the CPU 43 are examples that correspond to the "inverter" and the "controller", respectively, according to the present invention.

The above-described embodiments are mere examples and a work tool according to the present invention is not limited to the structures of the oscillating tools 100, 101 of the above-described embodiments. For example, the following modifications may be made. Further, one or more of these modifications may be used in combination with any one of the oscillating tools 100, 101 of the above-described embodiments or the claimed invention.

The number, shape and circumferential arrangement positions of the elastic ribs 371 formed in the elastic connection part 37 of the inner housing 3, 30 may be appropriately changed. For example, any desired number (two, three, five or more) of the elastic ribs 371 may be provided. It is noted, however, in a case where the inner housing 3, 30 includes a plurality of divided component parts in the left-right direction, such as the left shell 391 and the right shell 392, it may be preferable to provide two or more elastic ribs 371 on each of the component parts. Further, like in the above-described embodiments, in a case where a portion of the outer housing 2 which is elastically connected to the rear part 33, 330 is disposed within the internal space 370, the number, shape and circumferential arrangement positions of the elastic ribs 371 may be determined in consideration of the size of the portion and the size of an opening (or openings) between the adjacent elastic ribs 371.

Further, the portion of the outer housing 2 which is disposed within the internal space 370 is not limited to the switch holder 30, but it may be a portion which has only a function of elastically connecting to the rear part 33, 330, or a portion having any other function (such as a holder for holding only the speed-change dial unit 8). Further, the portion of the outer housing 2 which is disposed within the internal space 370 does not necessarily have to be formed as a separate member and fixed to the upper and lower shells 27, 28 (or the cover part which covers the inner housing 3), but it may be a portion protruding into the internal space 370 from the upper shell 27 or the lower shell 28. Alternatively, in place of the portion disposed within the internal space 370, an inner portion of the rear part 23 may be connected to the rear part 33, 330 via the rear elastic member(s) 76.

Further, in the above-described embodiments, the elastic rib 371 is formed to have a band-like shape so as to be imparted with flexibility, and also made of synthetic resin having a smaller elastic modulus than the other parts. Integrally forming the elastic ribs 371 with the front part 31, the extending part 35 and the rear part 33, 330 to obtain such a structure may be preferable from viewpoints of ease of assembly and manufacturing costs. However, the extending part 35 and the rear part 33, 330 may be elastically connected, for example, via a rubber element or a spring element formed as a separate member. Further, the elastic ribs 371 may be made of the same material as the front part 31, the extending part 35 and the rear part 33, 330, in a case where the elastic ribs 371 are configured to have elasticity (for example, shaped to easily elastically deform like in the above-described embodiments). Further, the elastic ribs 371 do not necessarily have to be shaped to more easily elastically deform than the other parts like in the above-described embodiments, in a case where the elastic ribs 371 are at least partially made of a material having a smaller elastic modulus than the other parts.

Like the elastic ribs 371, the front elastic members 71 and the rear elastic members 76 can be appropriately changed in number, shape and circumferential arrangement positions, as long as the outer housing 2 and the inner housing 3, 30 can be elastically connected so as to be movable in all directions (the front-rear, left-right and up-down directions) relative to each other. In the first embodiment, the structure that the rear part 33 is connected to the outer housing 2 via the rear elastic members 76 may be preferable from a viewpoint of stabilizing the positional relation between the battery 93 and the outer housing 2, but the rear elastic members 76 may be omitted. Also in the second embodiment, the rear elastic members 76 may be omitted. The intermediate elastic members 78 may also be omitted. Further, in the above-described embodiments, the front, rear and intermediate elastic members 71, 76, 78 are made of the same material (microcellular polyurethane elastomer), but they may be made of different materials from each other, or may be formed as different elements such as a rubber element and a spring element.

In view of the natures of the present invention, the above-described embodiments and modifications thereof, the following Aspects 1 to 3 can be provided. Each of the aspects can be used in combination with any one of the oscillating tools 100, 101 of the above-described embodiments, the above-described modifications or the claimed inventions.

(Aspect 1)

The second elastic members may be configured as flexible members.

(Aspect 2)

The second elastic members may be symmetrically arranged with respect to a virtual plane including the first axis and the second axis.

(Aspect 3)

In the elastic connection part, the internal space may be communicatively connected with an outside via an opening defined between the second elastic members in the circumferential direction, and the opening may provide a connection path when the portion of the outer housing which is disposed within the internal space and the second end part are connected via the third elastic member.

Further, in view of an object to provide a simple and rational connecting structure for component parts of a housing of a work tool, the following Aspects 4 to 10 can be provided.

(Aspect 4)

A work tool configured to perform an operation on a workpiece by driving a tool accessory, the work tool comprising:

a motor having an output shaft, the output shaft being rotatable around a first axis;

a spindle having a tool mounting part and configured to reciprocally rotate within a prescribed angle range around a second axis by power of the motor and thereby oscillate the tool accessory mounted to the tool mounting part within an oscillation plane, the tool mounting part being configured such that the tool accessory is removably mounted thereto, the second axis being parallel to the first axis, the oscillation plane being orthogonal to the second axis; and an elongate housing in which the motor and the spindle are housed, wherein:

when a longitudinal direction of the housing is defined as a front-rear direction, the housing includes:

a front housing part in which at least the spindle is housed; and a rear housing part connected to a rear end portion of the front housing part and extending rearward, the front housing part includes a first contact part, the first contact part having at least one first contact surface, the at least one first contact surface extending in a direction crossing the oscillation plane, the rear housing part includes a second contact part, the second contact part having at least one second contact surface, the at least one second contact surface extending in the direction crossing the oscillation plane, and the first and second contact parts are connected together in a state in which the at least one first contact surface and the at least one second contact surface are held in contact with each other.

In the work tool configured to oscillate the tool accessory mounted to the spindle within the oscillation plane, vibrations are caused in the front housing part. The most dominant among such vibrations is a vibration in a direction (oscillating direction) in which the tool accessory is oscillated. According to the present aspect, the first and second contact parts are connected together in the state in which the first and second contact surfaces, both of which extend in the direction crossing the oscillation plane, are held in contact with each other. With this structure, the front and rear housing parts can be connected together while a relative movement of the front and rear housing parts in the oscillating direction is effectively restricted. Further, occurrence of a relative slippage between the first and second contact surfaces can be suppressed, so that heat generation and occurrence of abnormal vibration can be suppressed effectively. As described above, a simple and rational structure for connecting the front and rear housing parts can be realized.

(Aspect 5)

The work tool as defined in Aspect 4, wherein, when an extending direction of the first and second axes is defined as an up-down direction, and a direction orthogonal to the front-rear direction and the up-down direction is defined as a left-right direction, the at least one first contact surface and the at least one second contact surface are arranged to extend in a direction crossing the left-right direction.

According to the present aspect, the first and second contact parts can be connected together without increasing the size of the housing.

(Aspect 6)

The work tool as defined in Aspect 4 or 5, wherein the motor is housed behind the spindle in the front housing part.

When the motor and the spindle are housed in the front housing part, large vibrations tend to be caused in the front housing part. According to the present aspect, however, the relative movement of the front and rear housing part can be effectively suppressed.

(Aspect 7)

The work tool as defined in Aspect 6, wherein the first contact part is disposed behind the motor.

In a case where the first contact part is disposed to overlap the motor (in other words, on left or right side of the motor), the size of the housing in the left-right direction tends to be increased. Since the first contact part is disposed behind the motor in the present aspect, the first and second contact parts can be connected together without increasing the size of the housing in the left-right direction.

(Aspect 8)

The work tool as defined in any one of Aspects 4 to 7, wherein the front and rear housing parts respectively have first and second mating surfaces, the first and second mating surfaces being parallel to the oscillation plane.

In a case where the first and second mating surfaces, which are parallel to the oscillation plane, slide relative to each other, it may lead to heat generation. In the present embodiment, the first and second contact parts can suppress the relative movement of the front and rear housing parts and thus the relative sliding of the first and second mating surfaces. Therefore, the possibility of the heat generation can be effectively reduced.

(Aspect 9)

The work tool as defined in any one of Aspects 4 to 8, wherein:

the rear housing part includes left and right parts divided in the left-right direction, the second contact part includes:

a left contact part provided in the left part; and a right contact part provided in the right part, the at least one first contact surface includes:

a left first contact surface provided on a left side of the first contact part; and a right first contact surface provided on a right side of the first contact part, the at least one second contact surface includes:

a left second contact surface provided on the left contact part; and a right second contact surface provided on the right contact part, and the first contact part and the second contact part are fixed with screws in a state in which the first contact part is held between the left contact part and the right contact part, and the left first contact surface and the right first contact surface are respectively held in contact with the left second contact surface and the right second contact surface.

In the present aspect, the first and second contact surfaces make contact with each other in two contact regions, namely, a region where the left first contact surface makes contact with the left second contact surface, and a region where the right first contact surface makes contact with the right second contact surface. Compared with a structure in which the first and second contact surfaces make contact with each other in only one contact region, the structure of the present aspect can more reliably suppress the relative movement of the front and rear housing parts in the oscillating direction. Further, a structure of firmly connecting the first and second contact parts can be realized by fixing the first contact part held between the left and right parts with the screws.

(Aspect 10)

The work tool as defined in any one of Aspects 4 to 9, further comprising an outer housing that covers the housing, wherein the housing and the outer housing are connected via an elastic member.

According to the present aspect, transmission of the vibrations to the outer housing, which is touched by a user, can be suppressed.

Correspondences between the features of the embodiment and the features of Aspects 4 to 10 are as follows. The oscillating device 100, 101 are examples of the "work tool". The motor 53, output shaft 531, and axis A2 are examples of the "motor", "output shaft" and "first axis", respectively. The spindle 51, tool mounting part 511, axis A1, and oscillating plane OP are examples of the "spindle", "tool mounting part", "second axis" and "oscillating plane", respectively. The inner housing 3, 30, metal housing 38, resin housing 39 are examples of the "housing", "front housing part" and "rear housing part", respectively. The contact part 387, first contact surface 380 are examples of the "first contact part" and "first contact surface", respectively. The protruding part 394 (large-diameter part 395) and second contact surface 390 are examples of the "second contact part" and "second contact surface", respectively.

The upper end surface 384 of the motor housing part 383 is an example of the "first mating surface". The lower end surface 312 of the motor cover part 311 is an example of the "second mating surface". The left and right shells 391, 392 are examples of the "left part" and "right part", respectively. The protruding part 394 (large-diameter part 395) of the left shell 391 is an example of the "left contact part". The protruding part 394 (large-diameter part 395) of the right shell 392 is an example of the "right contact part". The first contact surface 380 as the left side surface of the contact part 387 is an example of the "left first contact surface". The first contact surface 380 as the right side surface of the contact part 387 is an example of the "right first contact surface". The second contact surface 390 of the left shell 391 is an example of the "left second contact surface". The second contact surface 390 of the right shell 392 is an example of the "right second contact surface". The outer housing 2 is an example of the "outer housing". Each of the front elastic members 71 and rear elastic members 76 is an example of the "elastic member".

The work tool according to any one of Aspects 4 to 10 is not limited to the structures of the oscillating tools 100, 101 of the above-described embodiments. For example, the following modifications may be made. Further, one or more of these modifications may be used in combination with any one of the oscillating tools 100, 101 of the above-described embodiments or the claimed invention.

The structure for connecting the metal housing 38 and the resin housing 39 is not limited to the structure using the contact part 387 and the protruding part 394, but can be modified as desired. For example, the size and shape of the contact part 387 may be changed, as long as the contact part 387 has a contact surface that crosses the oscillation plane of the tool accessory 91. In this case, the resin housing 39 may include a portion which has a surface held in contact with the contact surface of the metal housing 38. In the above-described embodiments, the second contact surfaces 390 of the two projections 394 of the left shell 391 and the second contact surfaces 390 of the two projections 394 of the right shell 392 are held in contact with the two first contact surfaces 380 which are left and right side surfaces of the contact part 387. In other words, the plurality of first contact surfaces 380 and second contact surfaces 390 are provided and held in contact with each other in plurality of positions. However, each of the metal housing 38 and the resin housing 39 may have only one contact surface. The contact surfaces of the metal housing 38 and the resin housing 39 may be a flat surface or a curved surface. Further, it is acceptable that the contact surfaces of the metal housing 38 and the resin housing 39 each cross the oscillation plane of the tool accessory 91, but it may be preferable that the contact surfaces are generally orthogonal to the oscillation plane.

The other structures and internal configuration of the metal housing 38 and the resin housing 39 may also be modified as desired. For example, the open top of the motor housing part 383 of the metal housing 38 may be covered with a portion of the metal housing 38, in place of the motor cover part 311, which is a portion of the resin housing 39. Further, the resin housing 39 does not need to be formed by the divided left and right shells 391, 392, but may be formed in a cylindrical shape and connected to the rear end portion of the metal housing 38. From a viewpoint of suppressing transmission of vibration to the grip part 25, it may be preferable that the housing 1 has a two-layered structure in which the outer housing 2 and the inner housing 3 are elastically connected with each other. However, the housing 1 may have a single-layer structure.

DESCRIPTION OF THE NUMERALS 100, 101: oscillating tool, 1: housing, 2: outer housing, 21: front part, 23: rear part, 25: central part (grip part), 27: upper shell, 271: cylindrical part, 273: cylindrical part, 275: through hole, 28: lower shell, 281: through hole, 283: through hole, 20: switch holder, 202: body part, 203: first holding part, 204: first aim part, 205: tip, 206: cylindrical part, 207: screw, 209: dial holding part, 29: switch, 290: slider, 291: switch lever, 292: rotating part, 293: interlocking part, 3, 30: inner housing, 31: front part, 311: motor cover part, 312: lower end surface, 313: threaded hole, 33, 330: rear part, 331: battery mounting part, 332: control unit housing part, 333: second holding part, 334: second arm part, 335: projection, 35: extending part, 353: stepped part, 37: elastic connection part, 370: internal space, 371: elastic rib, 38: metal housing, 380: first contact surface, 381: spindle housing part, 382: recess, 383: motor housing part, 384: upper end surface, 385: screw inserting part, 386: screw, 387: contact part, 388: through hole, 389: screw, 39: resin housing, 390: second contact surface, 391: left shell, 392: right shell, 394: projection, 395: large-diameter part, 396: small-diameter part, 397: through hole, 398: threaded hole, 4, 40: control unit, 41: AC-DC converter, 42: three-phase inverter, 43: CPU, 5: driving mechanism, 51: spindle, 511: tool mounting part, 52: clamp shaft, 521: clamp head, 523: groove part, 53: motor, 531: output shaft, 55: transmitting mechanism, 551: eccentric shaft, 553: oscillating arm, 555: drive bearing, 6: lock mechanism, 61: operation lever, 62: rotary shaft, 621: eccentric part, 63: compression coil spring, 65: collar, 67: clamp member, 671: ridge part, 71: front elastic member, 711: through hole, 72: connecting member, 721: base part, 724: cylindrical part, 725: projection, 726: screw, 76: rear elastic member, 761: through hole, 78: intermediate elastic member, 8: speed-change dial unit, 81: body part, 82: variable resistor, 821: body, 822: rotary shaft, 825: terminal, 83: collar, 831: engagement recess, 832: O-ring, 833: restricting piece, 84: circuit board, 840: lead wire, 841: wire connecting region, 842: connection hole, 844: connection hole, 85: case, 87: dial, 871: fitting hole, 872: projection, 873: stepped recess, 88: partition, 881: mounting part, 882: engagement arm, 884: intervening part, 887: stopper part, 91: tool accessory, 93: battery, A1: axis, A2: axis, A3: axis, OP: oscillation plane, VP: vertical plane

What is claimed is:

1. A work tool configured to perform an operation on a workpiece by driving a tool accessory, the work tool comprising:
an outer housing having an elongate shape;
an inner housing having an elongate shape and housed in the outer housing;
a motor having an output shaft, the output shaft being rotatable around a first axis extending in a direction crossing a longitudinal direction of the inner housing;

a spindle rotatably supported around a second axis extending in parallel to the first axis, the spindle being configured such that the tool accessory is removably mounted thereto; and a transmitting mechanism configured to transmit rotation of the output shaft to the spindle to reciprocally rotate the spindle within a prescribed angle range around the second axis, wherein:

the inner housing includes:
- a first end part, the first end part being one end part in the longitudinal direction;
- a second end part, the second end part being another end part in the longitudinal direction;
- an extending part integrally formed with the first end part and extending toward the second end part in the longitudinal direction; and
- an elastic connection part configured to elastically connect the extending part and the second end part, the motor, the spindle and the transmitting mechanism are disposed in the first end part of the inner housing, the first end part is connected to the outer housing via a first elastic member, the second end part includes a power-source-related device configured to enable power supply from a power source to the motor, the elastic connection part includes a plurality of second elastic members, the plurality of second elastic members connecting the extending part and the second end part, and the second elastic members are spaced apart from each other in a circumferential direction around the longitudinal direction.

2. The work tool as defined in claim 1, wherein the power-source-related device comprises a battery mounting part, the battery mounting part being configured such that a battery serving as the power source is removably mounted thereto.

3. The work tool as defined in claim 1, wherein the power-source-related device includes:
- a cable connectable to an external alternating-current power source serving as the power source; and
- a converter connected to the cable and configured to convert alternating current into direct current.

4. The work tool as defined in claim 3, further comprising:
- an inverter configured to convert the direct current converted by the converter into alternating current to drive the motor; and
- a controller configured to control driving of the motor via the inverter, wherein:

the inverter and the controller are disposed in the second end part.

5. The work tool as defined in claim 1, wherein:
the outer housing includes a grip part configured to be held by a user, and
the extending part is a portion of the inner housing which corresponds to at least part of the grip part.

6. The work tool as defined in claim 1, wherein the second elastic members are formed to have a smaller elastic modulus than the extending part and the second end part.

7. The work tool as defined in claim 1, wherein the second end part is connected to the outer housing via a third elastic member.

8. The work tool as defined in claim 7, wherein:
the outer housing includes a portion disposed within an internal space of the elastic connection part, the internal space being surrounded by the second elastic members, and
the second end part is connected to the portion disposed within the internal space via the third elastic member.

9. The work tool as defined in claim 8, wherein the portion of the outer housing disposed within the internal space is formed as a separate member from a cover part of the outer housing and fixed to the cover part, the cover part being another portion of the outer housing covering the inner housing.

10. The work tool as defined in claim 8, wherein the portion of the outer housing disposed within the internal space is configured as a switch holding member, the switch holding member being configured to hold a switch for activating the motor.

11. The work tool as defined in claim 8, wherein, in the elastic connection part, the internal space is communicatively connected with an outside via an opening defined between the second elastic members in the circumferential direction, and
the opening provides a connection path when the portion of the outer housing which is disposed within the internal space and the second end part are connected via the third elastic member.

12. The work tool as defined in claim 1, wherein the first elastic member comprises a material having a microfoam structure.

13. The work tool as defined in claim 1, wherein:
in a case where the longitudinal direction is defined as a front-rear direction, an extending direction of the first axis and the second axis is defined as an up-down direction, and a direction crossing the front-rear direction and the up-down direction is defined as a left-right direction, the extending part includes a left part and a right part connected together to form the extending part, and
the second elastic members includes:
- at least two second elastic members connected to the left part; and
- at least two other second elastic members connected to the right part.

14. The work tool as defined in claim 1, further comprising:
a fourth elastic member disposed between the inner housing and the outer housing and configured to restrict a movement of the inner housing relative to the outer housing in a direction of reciprocating rotation of the spindle.

15. The work tool as defined in claim 1, wherein the second elastic members are configured as flexible members.

16. The work tool as defined in claim 1, wherein the second elastic members are symmetrically arranged with respect to a virtual plane, the virtual plane including the first axis and the second axis.

* * * * *